United States Patent
Juliusson

(10) Patent No.: US 12,440,912 B2
(45) Date of Patent: Oct. 14, 2025

(54) WELD CIRCUIT CALIBRATION FOR ARC VOLTAGE COMPENSATION

(71) Applicant: ESAB AB, Gothenburg (SE)

(72) Inventor: David Juliusson, Gothenburg (SE)

(73) Assignee: ESAB AB, Gothenburg (SE)

( * ) Notice: Subject to any disclaimer, the term of this patent is extended or adjusted under 35 U.S.C. 154(b) by 929 days.

(21) Appl. No.: 17/588,850

(22) Filed: Jan. 31, 2022

(65) Prior Publication Data

US 2023/0234154 A1 Jul. 27, 2023

Related U.S. Application Data

(60) Provisional application No. 63/302,636, filed on Jan. 25, 2022.

(51) Int. Cl.
| | | |
|---|---|---|
| *B23K 9/095* | (2006.01) | |
| *B23K 9/09* | (2006.01) | |
| *B23K 9/10* | (2006.01) | |

(52) U.S. Cl.
CPC .............. *B23K 9/0953* (2013.01); *B23K 9/09* (2013.01); *B23K 9/091* (2013.01); *B23K 9/0956* (2013.01); *B23K 9/1062* (2013.01)

(58) Field of Classification Search
CPC .......... B23K 9/09; B23K 9/091; B23K 9/095; B23K 9/0953; B23K 9/0956; B23K 9/1062
See application file for complete search history.

(56) References Cited

U.S. PATENT DOCUMENTS

| | | |
|---|---|---|
| 7,009,144 B2 | 3/2006 | Schmidt et al. |
| 8,344,287 B2 | 1/2013 | Schmitt et al. |
| 9,132,503 B2 | 9/2015 | Schmitt et al. |
| 9,387,550 B2 | 7/2016 | Davidson et al. |
| 9,506,958 B2 | 11/2016 | Davidson et al. |

(Continued)

FOREIGN PATENT DOCUMENTS

| | | |
|---|---|---|
| CN | 106513935 A | 3/2017 |
| CN | 107576839 A | 1/2018 |
| FR | 2850463 A1 | 7/2004 |

OTHER PUBLICATIONS

Notification of Transmittal of International Search Report and Written Opinion including International Search Report and Written Opinion for International Application PCT/IB2023/050589 mailed May 16, 2023, 14 pages.

*Primary Examiner* — Brian W Jennison

(74) *Attorney, Agent, or Firm* — Edell, Shapiro & Finnan, LLC

(57) ABSTRACT

A method is performed in a welding or cutting system including a power supply configured to deliver current pulses through a weld circuit to a contact tip extending from a welding torch to create an arc on a workpiece. The method includes: while the contact tip is shorted to the workpiece to set an arc voltage equal to zero: sampling a current pulse to produce current values; and at a voltage sense point, on the power supply or the weld circuit, that is spaced-apart from the welding torch, sampling a voltage pulse associated with the current pulse to produce voltage values that differ from the arc voltage due to an electrical circuit parameter of the weld circuit; and computing a value of the electrical circuit parameter based on the current values, the voltage values, and the arc voltage equal to zero.

17 Claims, 13 Drawing Sheets

(56) References Cited

U.S. PATENT DOCUMENTS

| | | | |
|---|---|---|---|
| 9,969,024 B2 | 5/2018 | Denis | |
| 10,071,434 B2 | 9/2018 | Chantry et al. | |
| 10,265,796 B2 | 4/2019 | Hsu et al. | |
| 10,300,549 B2 | 5/2019 | Chantry et al. | |
| 10,464,155 B2 | 11/2019 | Davidson et al. | |
| 2012/0303175 A1* | 11/2012 | Lambert | B23K 9/0953 700/298 |
| 2014/0209587 A1 | 7/2014 | Davidson et al. | |
| 2017/0072498 A1 | 3/2017 | Davidson et al. | |
| 2017/0225254 A1* | 8/2017 | Ulrich | B23K 9/0953 |
| 2018/0050409 A1 | 2/2018 | Mehn et al. | |
| 2018/0050410 A1 | 2/2018 | Mehn et al. | |
| 2018/0111216 A1 | 4/2018 | Chantry et al. | |
| 2018/0257162 A1* | 9/2018 | Johnson | B23K 9/0953 |
| 2018/0354050 A1* | 12/2018 | DeCoster | B23K 9/0953 |
| 2019/0262929 A1 | 8/2019 | Winich | |
| 2019/0291201 A1 | 9/2019 | Bowman et al. | |

\* cited by examiner

WELD CIRCUIT CALIBRATION FOR ARC VOLTAGE COMPENSATION

CLAIM TO PRIORITY

This application claims priority to U.S. Provisional Application No. 63/302,636, filed Jan. 25, 2022, the entirety of which is incorporated herein by reference.

TECHNICAL FIELD

The present disclosure relates to apparatus and methods related to welding and cutting.

BACKGROUND

In welding and plasma cutting systems, accurate measurement of the weld current and the voltage of the electric arc between the welding/cutting electrode and a workpiece enable more precise control of the welding/cutting process. While measuring weld current is generally straightforward, precisely determining the arc voltage is a significant challenge. Various attempts have been made to more accurately determine arc voltage by measuring voltage in close proximity to the arc, but this approach typically requires additional sensors and feedback signals that add cost and complexity to the system. Remotely measuring arc voltage at the welding/cutting power supply is more convenient but suffers from inaccuracies caused by resistance and inductance present in the system between the power supply and the welding/cutting arc. Voltage variations caused by inductance can be particularly troublesome, because they fluctuate with changes in current, which are particularly prevalent in pulsed waveforms, and inductive effects may also vary throughout a welding/cutting operation as the physical arrangements of the welding power cables and the welding wire change. While schemes have been proposed to estimate and compensate for these effects, there remains a need to more accurately determine arc voltage at a point in the system remote from the welding/cutting arc, such as at the power supply.

DESCRIPTION OF EXAMPLE EMBODIMENTS

Overview

In an embodiment, a method is performed in a welding or cutting system including a power supply configured to deliver current pulses through a weld circuit to a contact tip extending from a welding torch to create an arc on a workpiece. The method includes: while the contact tip is shorted to the workpiece to set an arc voltage equal to zero: sampling a current pulse to produce current values; and at a voltage sense point, on the power supply or the weld circuit, that is spaced-apart from the welding torch, sampling a voltage pulse associated with the current pulse to produce voltage values that differ from the arc voltage due to an electrical circuit parameter of the weld circuit; and computing a value of the electrical circuit parameter based on the current values, the voltage values, and the arc voltage equal to zero.

In another embodiment, a method is performed in a welding or cutting system including a power supply configured to deliver a current to a welding torch to create an arc on a workpiece. The method includes sampling the current to produce digitized current values; filtering the digitized current values using a first digital filter to produce filtered digitized current values; sampling a voltage corresponding to the current to produce digitized voltage values; filtering the digitized voltage values using a second digital filter to produce filtered digitized voltage values; and controlling a current level of the current using the filtered digitized current values or the filtered digitized voltage values.

Example Embodiments

Figure 1:
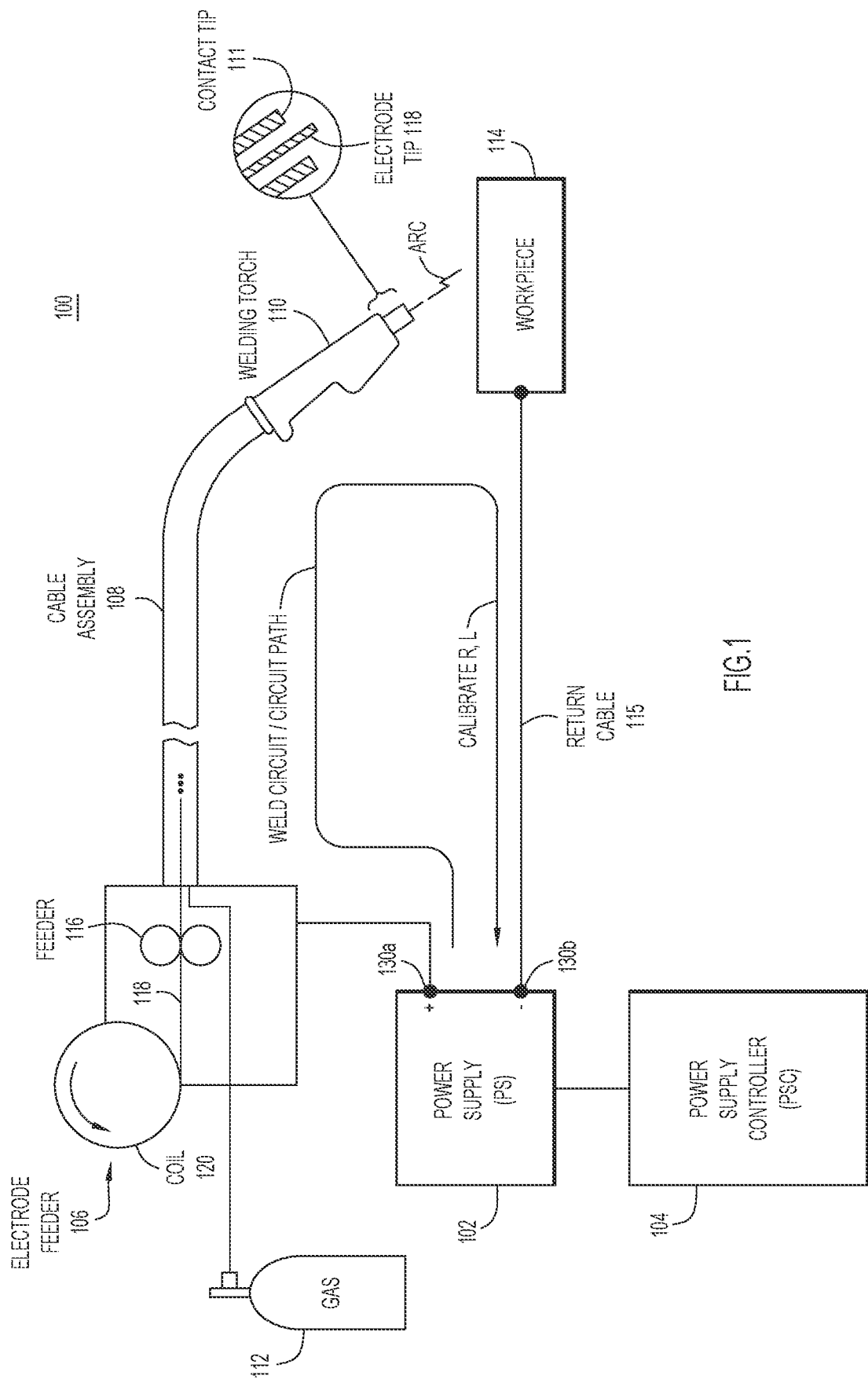
FIG. 1 is an illustration of an example welding system.

With reference to FIG. 1, there is an illustration of an example metal inert gas (MIG)/metal active gas (MAG) welding system 100, in which embodiments presented herein may be implemented. The embodiments are presented in the context of MIG/MAG welding by way of example only. It is understood that the embodiments may be employed generally in any know or hereafter developed welding environments, such as, but not limited to, tungsten inert gas (TIG) welding, flux cored arc welding (FCAW), shielded metal arc welding (SMAW) or stick welding, submerged arc welding (SAW), and so on. Additionally, the embodiments may be employed equally in an arc cutting apparatus. Welding system 100 includes: a power supply 102, such as a switching power supply; a power supply controller (PSC) 104 coupled to and configured to control the power supply; an electrode feeder 106 coupled to the power supply; a cable assembly 108 coupled to the electrode feeder; a welding gun or torch 110 coupled to the cable assembly and having a sturdy metal contact tip 111 that extends from an end of the welding gun or torch; a gas container 112 coupled to the cable assembly; and a workpiece 114 coupled to the power supply through at least a return path/cable 115. In the ensuing description, the terms "weld" and "welding" are synonymous and interchangeable. Also, the terms "weld" and "welding" refer broadly to both welding and plasma cutting systems and operations.

Electrode feeder 106 includes a feeder 116 to feed an electrode 118 from a coiled electrode 120 through cable assembly 108 and through contact tip 111 of welding torch 110, which is in electrical contact with the electrode. Under control of PSC 104, power supply 102 generates weld current that drives the welding process/operation. In an example, power supply 102 is a switching power supply that includes a power inverter having switching devices switched on and off with a duty cycle and at switching frequency controlled by PSC 104, to convert direct current (DC) power to high-frequency alternating current (AC) power, which is subsequently transformed and rectified to produce weld current. In welding operations that involve a pulsed or periodic waveform, the weld current typically includes a series of weld current pulses. Power supply 102 provides the weld current from an output terminal 130*a* of the power supply to electrode 118, through electrode feeder 116, cable assembly 108, and welding torch 110, while the cable assembly also delivers a shielding gas from gas container 112 to the welding torch.

The weld current creates an arc between workpiece 114 and a tip of electrode 118 (referred to as an "electrode tip" or an "electrode stick") extending through contact tip 111 of welding torch 110. To control the weld process, PSC 104 controls the weld current based in part on a voltage of the arc (i.e., an arc voltage). Thus, it is important for PSC 104 to acquire an accurate measurement of the arc voltage throughout the weld process. Because it may be impractical or inconvenient to sense the arc voltage directly at the arc itself, an arc voltage measurement may be made without sensing voltage equipment near the arc. For example, the arc voltage measurement may be made at a voltage sense point spaced-apart from the arc by a substantial distance along a circuit path of welding system 100 through which the weld current flows when the arc is present. The aforementioned circuit path is referred to as a "weld circuit," and may include, for example, a circuit path from output terminal 130*a* of power supply 102 to an output terminal 130*b* of the power supply, through electrode feeder 106, cable assembly 108, welding torch 110, workpiece 114, and return path 115 from workpiece 114 to output terminal 130*b* of the power supply.

The arc voltage measurement made at the voltage sense point differs from the arc voltage due to one or more voltage drops that are a function of the weld current, which changes dynamically, and one or more electrical circuit parameters or characteristics of the weld circuit through which the weld current flows. For example, the arc voltage may differ from the arc voltage measurement due to resistive and inductive voltage drops arising from a resistance and an inductance of the weld circuit. Accordingly, embodiments presented herein perform (i) calibration of the weld circuit to determine values for the above-mentioned one or more electrical circuit parameters, and (ii) an arc voltage measurement compensation based in part on one or more computed (electrical circuit parameter-related) voltage drops that arise from the values of the one or more electrical circuit parameter, to produce an accurate estimate of the arc voltage. For example, the embodiments may perform (i) the calibration to determine values for one or more of the resistance and inductance in the weld circuit, and (ii) the arc voltage measurement compensation based in part on one or more computed resistive and inductive voltage drops that arise from the one or more resistance and inductance values, to produce the accurate estimate of the voltage arc.

Figure 2A:
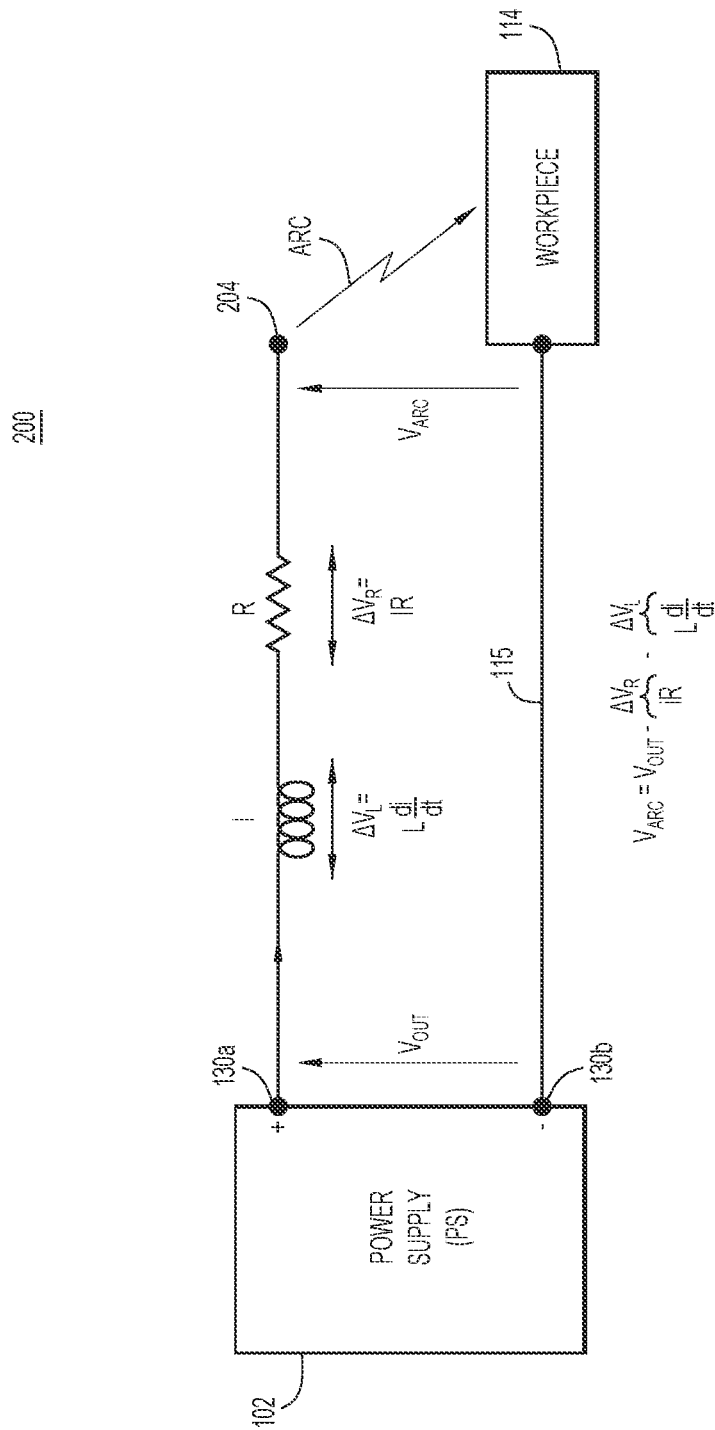
FIG. 2A is an illustration of an example equivalent circuit for a weld circuit of the welding system.

With reference to FIG. 2A, there is an illustration of an example equivalent circuit 200 for the above-mentioned weld circuit. Equivalent circuit 200 includes a resistance R and an inductance L of the weld circuit connected in series between output terminals 130*a* and 130*b* of power supply 102 and a terminal 204 that represents contact tip 111/the electrode tip at welding torch 110. Power supply 102 supplies weld current I to welding torch 110 through resistance and inductance R, L, which result in respective voltage drops $\Delta V_R = IR$, $\Delta V_L = L^*dI/dt$, where $dI/dt$ is a rate of change of current I, or current slope. Assuming a voltage Vat output terminals 130*a* and 130*b*, an arc voltage $V_{ARC}$ at terminal 204 is given by the following equation:

$$V_{ARC} = V - IR - L^*dI/dt$$

Armed with values for resistance R, inductance L, a measurement of voltage V, and a measurement of current I, arc voltage $V_{ARC}$ may be computed based on the equation above. Accordingly, embodiments presented herein perform (i) calibration of the weld circuit to determine the values of resistance and inductance R, L based on measurements of voltage V and current I, and (ii) arc voltage compensation to compensate the measurement of V for resistive and inductive voltage drops $\Delta V_R$ and $\Delta V_L$ based on resistance and inductance R, L, to produce an accurate estimate of arc voltage $V_{ARC}$.

Figure 2B:
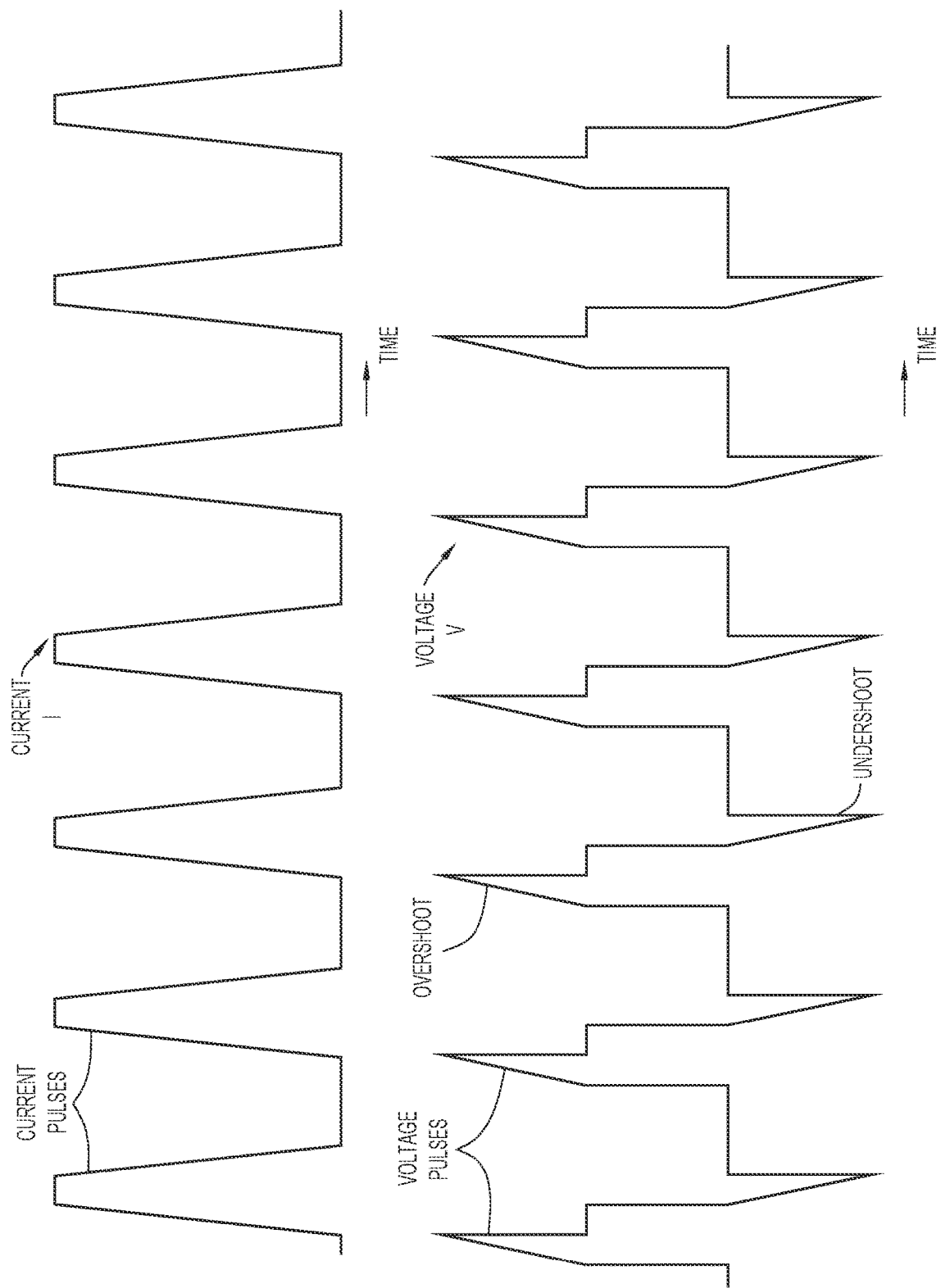
FIG. 2B is an illustration of an example current waveform for a weld current in the welding system, and an example voltage waveform for a voltage associated with the weld current.

With reference to FIG. 2B, there is an illustration of a current waveform for weld current I, and a voltage waveform for voltage V associated with the weld current. Weld current I includes a series of weld current pulses, and voltage V also includes a series of voltage pulses corresponding to the current pulses. Voltage V is offset from arc voltage $V_{ARC}$ due in part to the resistive voltage drop, and also because each voltage pulse includes a leading spike or overshoot voltage and a trailing spike or undershoot voltage that results from the inductive voltage drop ($L^*dI/dt$).

Figure 3:
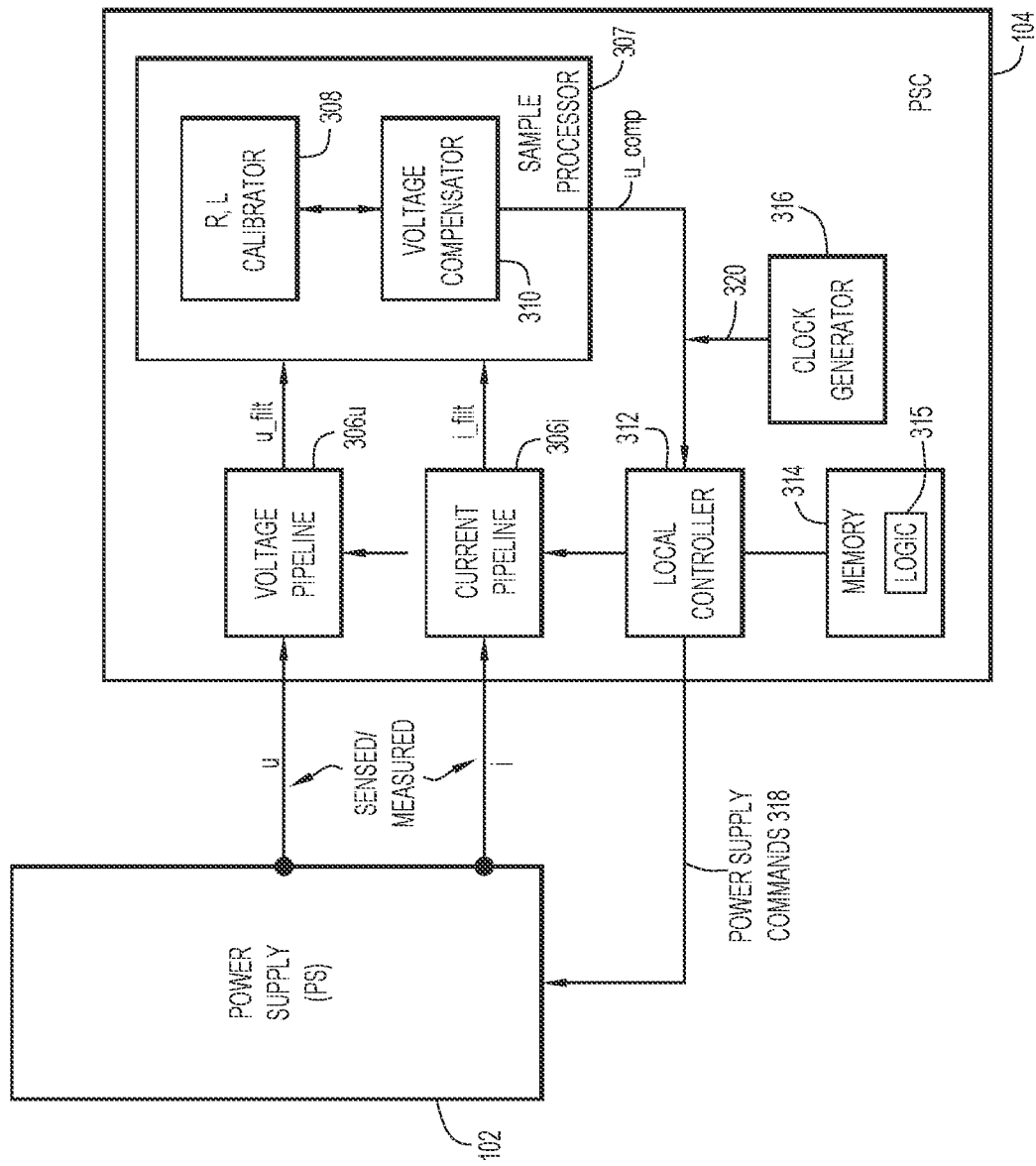
FIG. 3 is a block diagram of an example power supply controller (PSC) of a power supply of the welding system.

With reference to FIG. 3, there is a block diagram of an example of PSC 104, which may be implemented as an all-digital architecture, for example. In the example of FIG. 3, PSC 104 receives from a current sense point, such as a sense point in power supply 102, an analog current i that represents a measurement of weld current I generated by the power supply. PSC 104 also receives from a sense point, such as from output terminals 130*a* and/or 130*b* of power supply 102, an analog voltage u that is a measurement of voltage V associated with current i.

PSC 104 includes a voltage pipeline 306*u* to sample and condition (e.g., filter) analog voltage u, to produce filtered digitized voltage values u_filt (also referred to as voltage values u_filt). PSC also includes a current pipeline 306*i* to sample and condition (e.g., filter) analog current i, to produce filtered digitized current values i_filt (also referred to as current values i_filt). PSC 104 further includes a sample processor 307 to process current and voltage values i_filt and u_filt. For example, sample processor 307 includes a calibrator 308 and a voltage compensator 310. According to embodiments presented herein, calibrator 308 performs calibration of the weld circuit to determine values for resistance and inductance R, L of the weld circuit based in part on current and voltage values i_filt and u_filt. Also in accordance with embodiments presented herein, voltage compensator 310 performs arc voltage compensation to compensate voltage values u_filt, to produce compensated voltage values u_comp that represent accurate estimates of arc voltage $V_{ARC}$. The calibration and arc voltage compensation procedures performed by calibrator 308 and voltage compensator 310 may exchange various information with each in order to execute their respective operations, as described below.

PSC 104 also includes a local controller 312, such as a processor or microcontroller, a memory 314, and a clock generator 316 coupled with each other, and with current and voltage pipelines 306i, 306u and sample processor 307. The aforementioned components of PSC 104 are shown as separated/individual components in FIG. 3 by way of example only. It is understood that sample processor 307, current pipeline 306i, and voltage pipeline 306u may each be partly or wholly integrated into local controller 312. Controller 312 provides overall control of PSC 104 and power supply 102. To this end, controller 312 generates power supply control signals or commands 318 used to control the weld current generated by power supply 102. For example, controller 312 asserts commands 318 to control a current level of the weld current, and a timing of the weld current pulses, such as their start and stop times. Controller 312 also receives compensated voltage u_comp from sample processor 307, and asserts commands 318 responsive to the compensated voltage u_comp.

Memory 314 stores non-transitory computer readable program instructions/logic instructions 315 that, when executed by controller 312, cause the controller to perform the operations described herein, e.g., operations for sample processor 307. For example, memory 314 may store program instructions that implement the calibration and arc voltage compensation, and general current and voltage sample processing for a welding or cutting operation, which may include at least some of the processing performed by the current and voltage pipelines. Memory 314 also stores data used and produced by controller 312, such as values of compensated voltage u_comp, weld current levels, and so on. Clock generator 316 generates clocks 320 used to drive other components of PSC 104, such as current and voltage pipelines 306i, 306u, and sample processor 307. In embodiments, components of PSC 104 may include electronic circuitry such as, for example, programmable logic circuitry, field-programmable gate arrays (FPGA), or programmable logic arrays (PLA) to execute the computer readable program instructions, which may include microcode, firmware, and so on.

Figure 4:
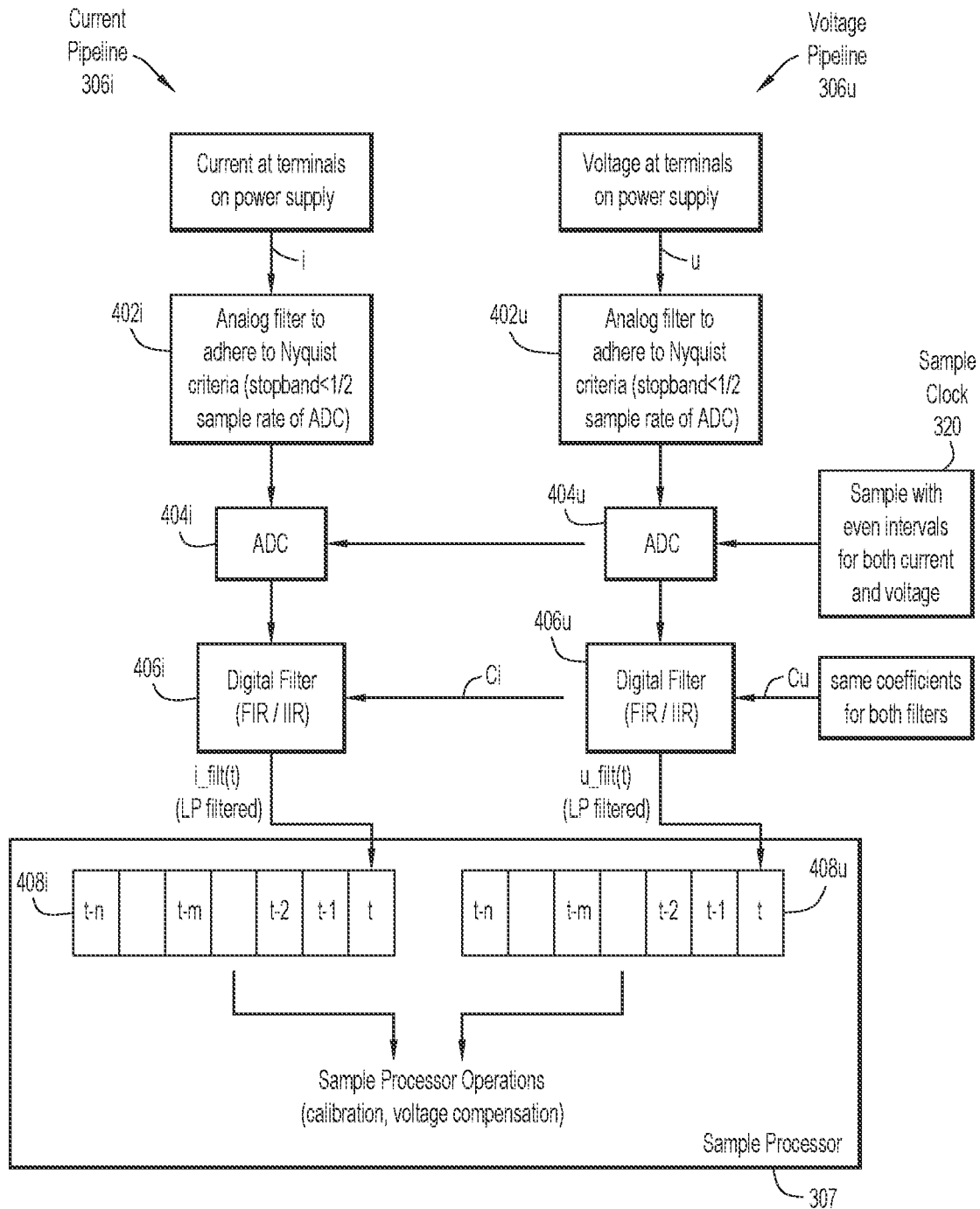
FIG. 4 is a block diagram of example current and voltage pipelines of the PSC for processing sensed current and voltage in the welding system, respectively.

With reference to FIG. 4, there is a block diagram of current pipeline 306i and voltage pipeline 306u, which may operate, i.e., perform their respective operations, in parallel with each other, i.e., concurrently. Current pipeline 306i includes, in sequence, an analog anti-alias (or "aliasing") filter 402i, an analog-to-digital converter (ADC) (or "digitizer") 404i, and a digital filter 406i. Digital filter 406i feeds a memory or sample buffer 408i, which may be implemented in voltage compensator 310 of sample processor 307. Current pipeline 306i receives current i as sensed at power supply 102, for example. Anti-alias filter 402i filters current i, to produce an anti-aliased current. Anti-alias filter 402i may be a low pass filter having a cut-off/stopband frequency that is ≤½ a sample rate of a sampling process to follow the anti-alias filtering, in order to satisfy the Nyquist criterion for the sampling process.

An analog-to-digital converter (ADC) 404i performs the sampling or digitizing process. As used herein, the terms "sampling" and "digitizing" are synonymous and may be used interchangeably. ADC 404i digitizes the anti-aliased current at a sample rate established by clocks 320, to produce a sequence of time ordered digitized current values, each associated with a corresponding sample time t. Example sample rates may be one mega samples per second (Msps) and above. As used herein, the term "value" is synonymous, and may be used interchangeably, with the term "sample." Moreover, any known or hereafter developed sampling/digitizing technique may be used to convert current i to digitized current values. For example, the analog anti-alias filter as well as the ADC may be configured as a differential measurement channel comprising more than one ADC.

Digital filter 406i includes a number of filter stages having a corresponding number of filter taps (e.g., M filter taps) that receive a set of filter weights/coefficients Ci (e.g., Ci1, Ci2, . . . , CiM) from controller 312, for example. Based on filter coefficients Ci, digital filter 406i digitally filters the digitized current values in the time domain, to produce a sequence of time ordered digitized (digitally) filtered current values i_filt. The term "i_filt" may refer to multiple filtered digitized current values or a single filtered digitized current value, depending on context. Examples of digital filter 406i include a Finite Impulse Response (FIR) filter and an Infinite Impulse response (IIR) filter. The coefficients Ci establish a time-domain step response, and a corresponding low pass, or band pass, frequency response, of digital filter 406i. In an example, the step/frequency response is configured to remove switching noise introduced onto analog current i and the current values by switching in power supply 102, hence a stopband of the frequency response is set depending on a switching frequency of the power supply, i.e., to attenuate noise associated with the switching frequency. In the example, digital filter 406i may be configured to have a low pass frequency response, to produce low pass filtered digitized current samples. The low pass frequency response may be maximally flat in its passband, such as the frequency response of a low pass $1^{st}$ or $2^{nd}$-order Butterworth filter (i.e., a Butterworth filter response) implemented as an IIR filter. An advantage of the IIR filter is that it can provide a sharper cut-off frequency with less stages/coefficients compared to the FIR filter. In an example, the low pass frequency response may have a cut-off frequency of approximately 5 kHz.

Digital filter 406i stores current values i_filt into memory buffer 408i of sample processor 307 in sample time order, e.g., with sample time increasing from left-to-right in FIG. 4. Thus, successive positions of the values in memory buffer 408i represent successive sample times (also referred to as sample time indexes) of the values. Thus, time differences between different ones of the values may be determined based on their positions. For example, traversing values in buffer 408i from right-to-left, the last sampled value has a sample time index t0, the previously sampled value has a sample time index t−1, the sample previous to that has a sample time index t−2, and so on. A known ADC sample rate r translates to a known period Δt=1/r between consecutive values (i.e., the sample period). Thus, a time difference between two values N samples apart is equal to N*Δt.

Similar to current pipeline 306i, voltage pipeline 306u includes, in series, an analog anti-alias filter 402u, an ADC or ("digitizer") 404u, and a digital filter 406u. Digital filter 406u feeds a memory or sample buffer 408u, which may be implemented in voltage compensator 310 of sample processor 307. Each of components 40Xu of voltage pipeline 306u operate similarly to corresponding components 40Xi of current pipeline 306i. Voltage pipeline 306u receives analog voltage u as sensed at output terminal 130a and 130b of power supply 102, for example. Anti-alias filter 402u filters analog voltage u, to produce an anti-aliased voltage u. Anti-alias filter 402u may be a low pass filter having a cut-off/stopband frequency that is ≤½ a sample rate of a sampling process to follow the anti-alias filtering, in order to satisfy the Nyquist criterion for the sampling process.

ADC 404u digitizes the anti-aliased voltage at a sample rate established by clocks 320, to produce a sequence of time ordered digitized voltage values, each associated with a corresponding sample time t. Any known or hereafter developed sampling/digitizing technique may be used to convert the anti-aliased voltage to digitized voltage values. For example, the analog anti-alias filter as well as the ADC may be configured as a differential measurement channel comprising more than one ADC. In an example, ADC 404u and ADC 404i perform their respective sampling based on the same sample clock, so that the digitized voltage values and the digitized current values are produced concurrently and at the same rate. That is, for each digitized voltage value, there is a corresponding digitized current value, which is produced at the same time (i.e., concurrently) as the digitized voltage value.

Digital filter 406u includes a number of filter stages and a corresponding number of filter taps that receive a set of filter weights/coefficients Cu (e.g., Cu1, Cu2, and so on) from controller 312, for example. Based on filter coefficients Cu, digital filter 406u digitally filters the digitized voltage values in the time domain, to produce a sequence of time ordered filtered digitized voltage values u_filt. The term "u_filt" may refer to multiple filtered digitized voltage values or a single filtered digitized voltage value, depending on context. Examples of digital filter 406u include an FIR filter and an IIR filter. The coefficients Cu establish a time-domain step response, and a corresponding low pass frequency response, of digital filter 406u. In an example, the step/frequency response is configured to remove switching noise introduced onto analog voltage u and the voltage values by switching in power supply 102, hence a stopband of the frequency response is set depending on a switching frequency of the power supply, i.e., to attenuate the switching frequency. In the example, digital filter 406u may be configured to have a low pass frequency response. The low pass frequency response may be maximally flat in the passband, such as the frequency response of a low pass $1^{st}$ or $2^{nd}$ order Butterworth filter. In an example, digital filter 406u and 406i are equivalent. That is, both digital filters have the same (i.e. matching) numbers of stages and taps, use the same (i.e., matching) sets of filter coefficients, have the same (i.e., matching) step responses, and have the same (i.e., matching) frequency responses.

Digital filter 406u stores filtered voltage values u_filt into memory buffer 408u of sample processor 307 in time order, as shown in FIG. 4. Comparing memory buffers 408u and 408i, filtered voltage values u_filt in memory buffer 408u at locations/with time indexes t−n, t−m, t−2, t−1, and t0 correspond to (i.e., were sampled concurrently with corresponding ones of) filtered current values i_filt in memory buffer 408i at locations/time indexes t−n, t−m, t−2, t−1, and t0. Current and voltage values i_filt, u_filt having the same sample time index because they result from concurrent sampling of current and voltage i, u are referred to as a pair of concurrent current and voltage values, or simply as corresponding current and voltage values.

Over time, current and voltage pipelines 306i, 306u perform their respective operations concurrently, and repeatedly and continuously update memory buffers 408i, 408u with new filtered current and voltage values i_filt, u_filt. Sample processor 307 accesses the current and voltage values i_filt, u_filt stored in memory buffers 408i, 408u to perform calibration and voltage compensation based on the values, as described below.

Figure 5A:
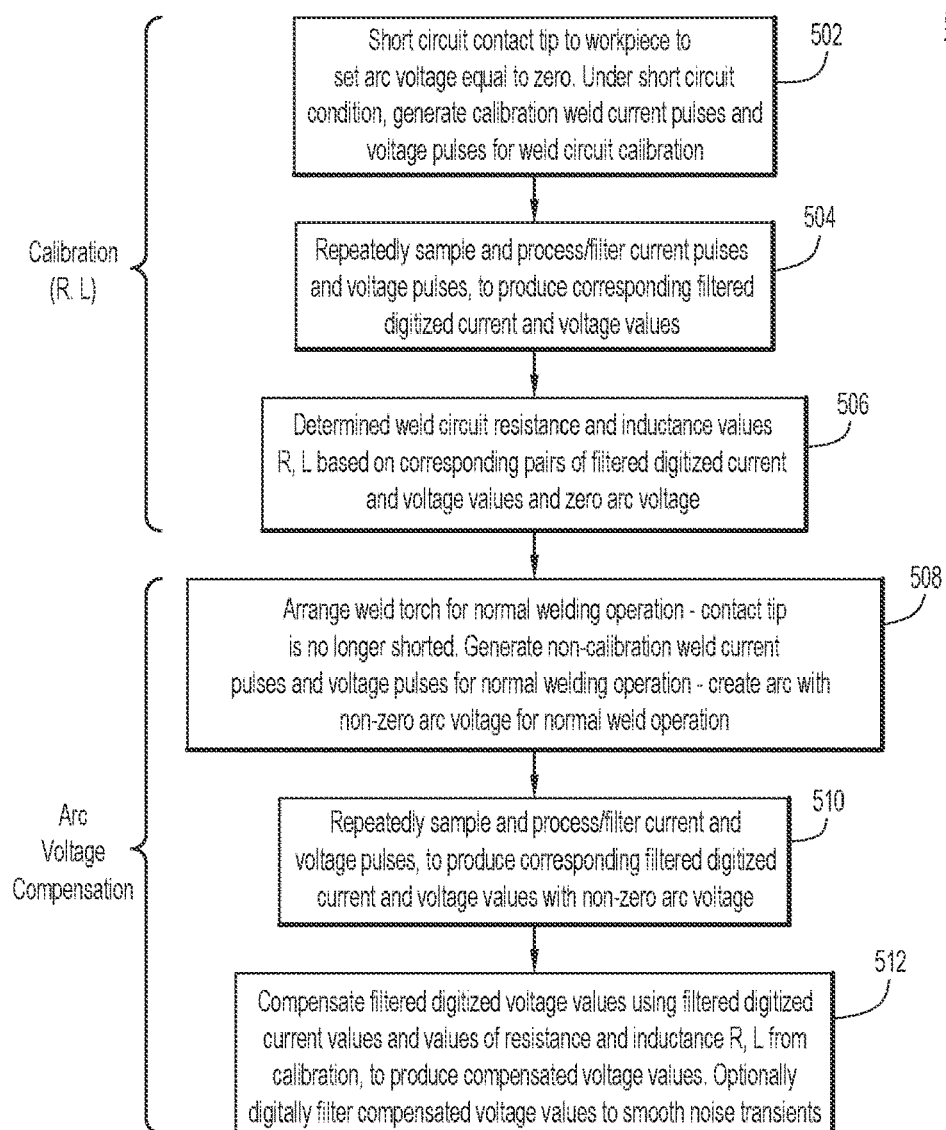
FIG. 5A shows example high-level operations for performing weld circuit calibration to determine values of resistance and inductance for the weld circuit, and arc voltage compensation to compensate a sensed voltage based on the resistance and inductance.

With reference to FIG. 5A, there are shown example high-level operations 500 used to implement (i) calibration to determine values of resistance and inductance R, L of the weld circuit, and (ii) arc voltage compensation to compensate voltage values u_filt based on the values for R, L determined by the calibration, to produce compensated voltage u_comp as an accurate estimate of the arc voltage. PSC 104 controls power supply 102 based on compensated voltage u_comp.

Operations 502-506 implement the calibration, while subsequent operations 508-512 implement the arc voltage compensation.

At 502, contact tip 111 of welding torch 110 is continuously placed in contact with, and thus electrically shorted to, workpiece 114 during the calibration. Under the short circuit condition, PSC 104 causes power supply 102 to generate calibration weld current and voltage, including a series of current pulses and corresponding voltage pulses. The series of current pulses and corresponding voltage pulses may include a first current pulse and a corresponding first voltage pulse, a second current pulse and a corresponding second voltage pulse, and so on. The series of current pulses and corresponding voltage pulses may be referred to as calibration current and voltage pulses. The short circuit condition results in an arc voltage equal to zero for the duration of the calibration current and voltage pulses.

At 504, while contact tip 111 (and possibly also the electrode) is shorted to workpiece 114, i.e., concurrent with operation 502, voltage and current pipelines 306i, 306u repeatedly sample and process analog current and voltage i, u to produce current and voltage values i_filt, u felt, as described above.

At 506, the calibration (e.g., calibrator 308) determines the (calibrated) values of one or more of resistance and inductance R, L of the weld circuit based on current and voltage values i_filt, u_filt produced at 504, and the arc voltage $V_{ARC}$ that is set to zero. Operation 506 may or may not be performed concurrently with operation 504. More generally, operation 506 determines values of one or more electrical circuit parameters of the weld circuit (e.g., values of one or more of resistance R and inductance L) that may cause (sensed/measured) voltage value u_filt to differ from the actual voltage $V_{ARC}$ by an amount that is equal to a voltage drop that is a result of the current value i_filt flowing through the one or more electrical circuit parameters.

In an example in which the calibration current and voltage pulses include a pair of (corresponding) first current and voltage pulses, a pair of second current and voltage pulses following the first current and voltage pulses, and so on, the calibration may (i) first determine/compute the value for resistance R, but not the value for inductance L, using first current and voltage values i_filt, u_filt sampled on the first current and voltage pulses, and then (ii) determine the value for inductance L using the known value of resistance R and second current and voltage values i_filt, u_filt sampled on the second current and voltage pulses. Assuming that the aforementioned sequential process (i.e., determine the value of resistance R using the first current and voltage pulses, then determine the value of inductance L using the second current and voltage pulses) initially determines only approximate values for resistance and inductance R, L, the process may be repeated using third current and voltage pulses and fourth current and voltage pulses, and so on, to improve the accuracy of the values of resistance and inductance R, L over time. In such a scenario, an average value for resistance R may be computed based on multiple individual values of the resistance taken across multiple pairs of current/voltage pulses. Similarly, an average value for inductance L may be computed based on multiple individual values of the inductance taken across multiple pairs of current/voltage pulses.

There are numerous permutations of the above theme. Another example determines a value for inductance L instead of resistance R using the first current and voltage values sampled on the first pulses, and then determines a value for resistance R using the second current and voltage values sampled on the second pulses and the known value of inductance L. Yet another example determines initial values for both inductance and resistance R, L at the same time, i.e., using the first current and voltage values sampled on the first pulses, and then refines the initial values using the second current and voltage values sampled on the second pulses.

Once the values of resistance and inductance R, L are determined at 506, next operations 508-512 implement the arc voltage compensation, i.e., compensate subsequent values of u_filt, to produce voltage compensated values u_comp that accurately represent the arc voltage.

At 508, welding torch 110 is arranged for a normal welding operation. That is, contact tip 111 is no longer continuously shorted to workpiece 114 as it was during the calibration. With the welding torch 110 no longer shorted to workpiece 114 for the calibration, PSC 104 controls power supply 102 to generate post-calibration weld current and voltage for a normal welding operation, including a series of post-calibration weld current pulses and corresponding weld voltage pulses. The weld current pulses create, at the electrode stick, an arc having a non-zero arc voltage suitable for the normal welding operation.

At 510, while welding torch 110 is arranged for normal welding operation, i.e., concurrent with operation 508, current and voltage pipelines 306i, 306u repeatedly sample and process analog current and voltage i, u to produce current and voltage values i_filt, u_filt, as described above (also referred to as weld current and voltage values). For example, current pipeline 306i samples current i (e.g., a current pulse) to produce digitized current values, and digitally filters the digitized current values using digital filter 406i, to produce digitally filtered digitized current values i_filt. Concurrent with the sampling and filtering of current i, voltage pipeline 306u samples voltage u (e.g., a voltage pulse) to produce digitized voltage values, and digitally filters the digitized current values using digital filter 406u, to produce digitally filtered digitized voltage values u_filt.

At 512, the arc voltage compensation (e.g., voltage compensator 310) compensates each of voltage values u_filt based on corresponding current values of i_filt and resistance and inductance values R, L from the calibration, to produce a respective compensated voltage u_comp for each of the voltage values u_filt.

Figure 5B:
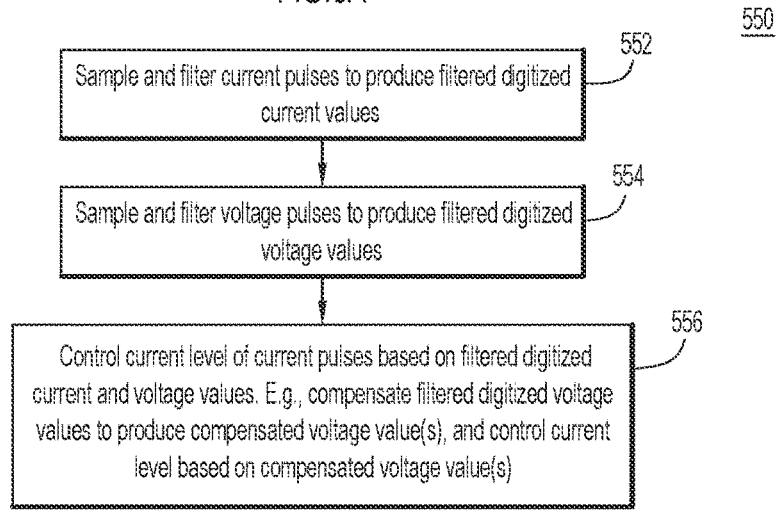
FIG. 5B shows example high-level operations performed by the PSC to control the power supply during normal welding.

With reference to FIG. 5B, there are shown example high-level operations 550 performed by PSC 104 to control power supply 102 during normal welding operation.

At 552, current pipeline 306i repeatedly samples and filters (using a first digital filter) the current pulses of current i generated by power supply 102, to produce (first) current values i_filt.

At 554, voltage pipeline 306u repeatedly samples and filters (using a second digital filter) voltage pulses in voltage u corresponding to current i, to produce (second) voltage values u_filt.

At 556, PSC 104 asserts control over power supply 102 to control a current level of the current pulses, based on current and voltage values i_filt, u_filt. More specifically, because voltage values u_filt differ from an actual arc voltage as a function of an electrical circuit parameter of the weld circuit and values of current values i_filt corresponding to the voltage values u_filt, PSC 104 compensates filtered digitized voltage values u_filt based on filtered digitized current values i_filt and a known value of the electrical circuit parameter, to produce compensated voltage values u_comp that accurately reflect the arc voltage. PSC 104 controls the current level (e.g., of a current pulse that was sampled or a subsequent current pulse) based on compensated voltage values u_comp. For example, PSC 104 compares compensated voltage values u_comp to a predetermined threshold for the arc voltage. When compensated voltage values u_comp exceed or do not exceed the predetermined threshold, PSC 104 asserts commands 318, for example, to cause power supply 102 to decrease or increase the current level, respectively, thus implementing a feedback control loop to control the current level.

High-level arc voltage compensation operation 512 described briefly above in connection with FIG. 5A is now described in further detail below.

Figure 6:
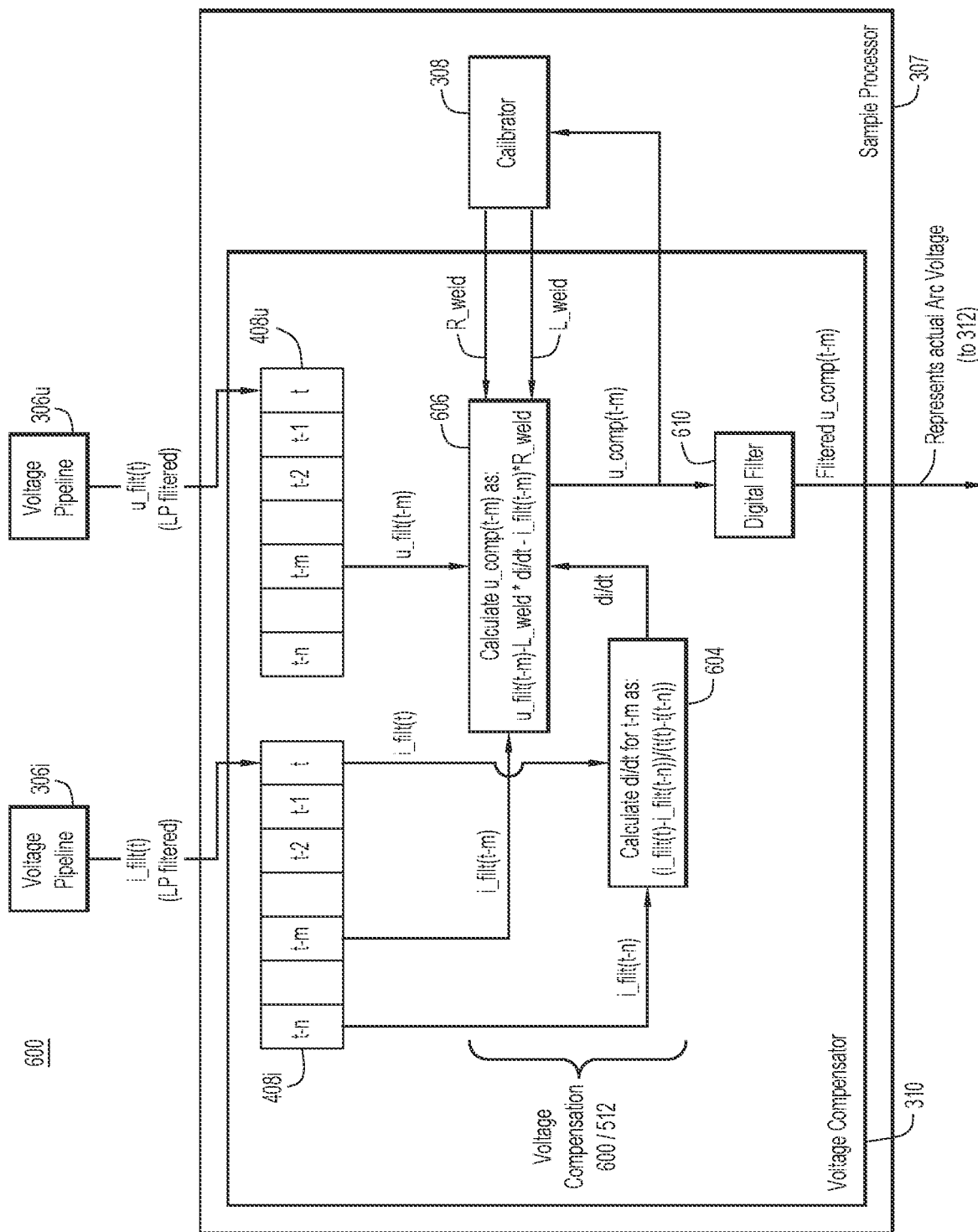
FIG. 6 shows example operations expanding on the arc voltage compensation operations of FIG. 5A.

With reference to FIG. 6, there is a block diagram that shows operations 600 performed by arc voltage compensator 310 that expand on compensation operation 512, described above. Operations 600 produce compensated voltage u_comp (which represents an estimate of the actual arc voltage) from voltage values u_filt, based on current values i_filt, and values of resistance and inductance R, L provided by the calibration. Operations 600 compute a single compensated voltage value u_comp, e.g., u_comp(t-m), corresponding to a single voltage value, e.g., u_filt(t-m), based on various other inputs, as described below.

At 604, the arc voltage compensation computes current slope di/dt at sample time t-m as:

$$di/dt(t-m)=(i\_\text{filt}(t)-i\_\text{filt}(t-n))/(t(t)-t(t-n)).$$

Thus, operation 604 employs two time-separated current values i_filt that straddle sample time t-m to compute di/dt. That is, sample time t-m represents a sample time (e.g., a midpoint) between the sample times of the current values used to compute di/dt.

At operation 606, the arc voltage compensation receives resistance and inductance values R and L (denoted R_weld and L_weld in FIG. 6) determined by the calibration (i.e., by calibrator 308), and computes compensated voltage value u_comp(t-m) as:

$$u\_\text{comp}(t-m)=u\_\text{filt}(t-m)-L*di/dt(t-m)-i\_\text{filt}(t-m)*R \quad \text{Equation (Eq) 1.}$$

Operations 604 and 606 repeat for successive current and voltage values i_filt, u_filt to produce successive compensated voltage values u_comp, where, for each successive compensated voltage value u_comp, sample time index t+1 replaces sample time index t, i.e., the sample time index is incremented. In other words, operations 600 are repeated over time to compute a respective compensated arc voltage value u_comp corresponding to each voltage value u_filt.

The term "u_comp" may refer to multiple compensated voltage values or a single compensated voltage value, depending on context.

In an embodiment, the arc voltage compensation also includes a digital filter 610 to digitally filter successive compensated arc voltage values u_comp, to produce a filtered version of compensated arc voltage values u-comp. Digital filter 610 may include an FIR or an IIR filter with a low pass frequency response to smooth high frequency noise/time transients in compensated voltage u_comp.

The weld circuit calibration is now described in further detail below in connection with FIGS. 7-11.

Figure 7:
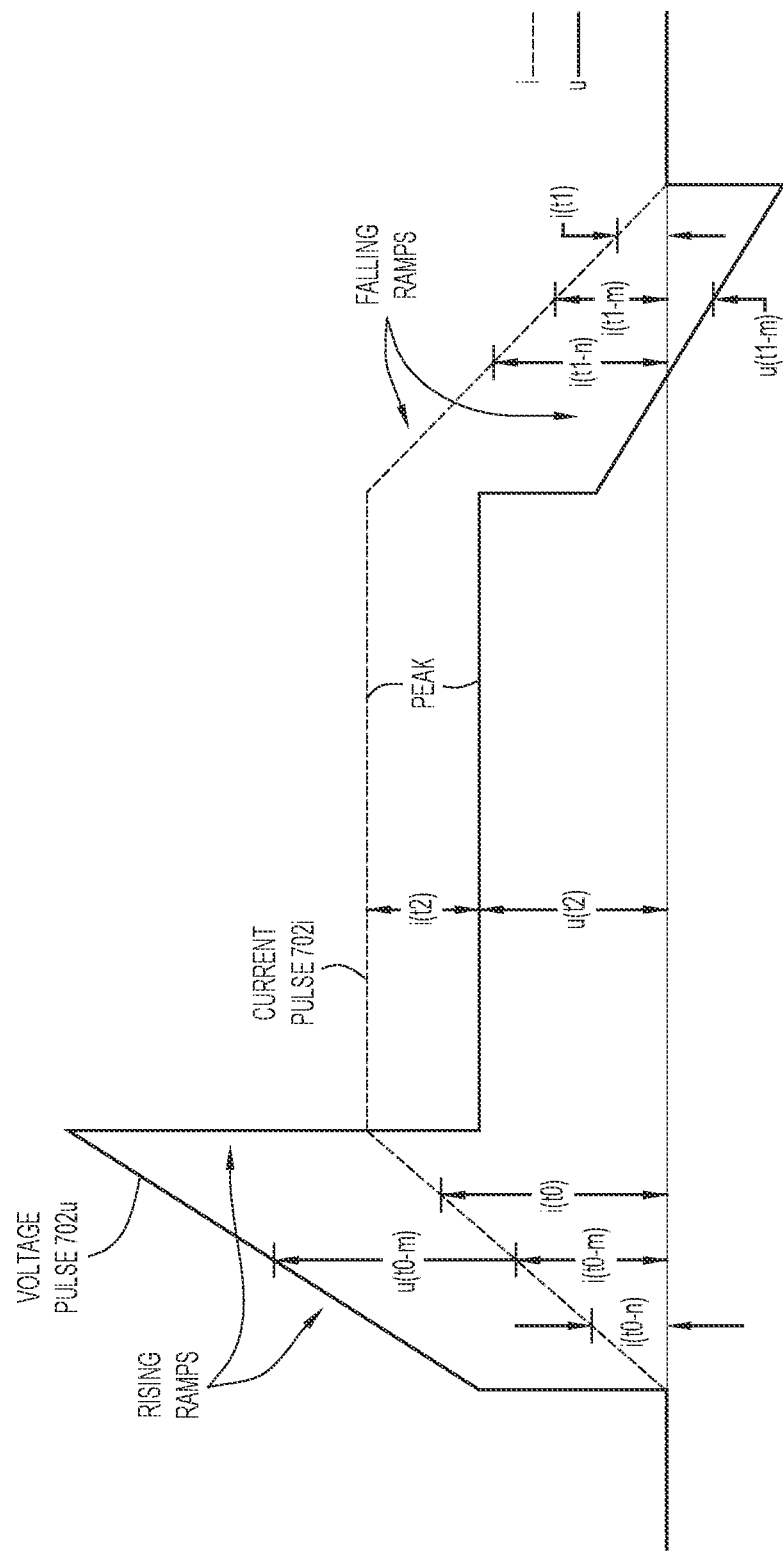
FIG. 7 is an illustration of example current and voltage sample times superimposed on idealized current and voltage waveforms for weld current and associated voltage.

As mentioned above, during the calibration, power supply 102 generates calibration weld current pulses and voltage pulses. With reference to FIG. 7, there is an illustration of an idealized current waveform 702i for a single current pulse, and an idealized voltage waveform 702u for the voltage pulse corresponding to the current pulse. Current and voltage waveforms 702i, 702u generally represent current pulses and corresponding voltage pulses generated during both the calibration operation and the arc voltage compensation. In practice, the current and voltage waveforms may include substantial current and voltage noise, not shown in FIG. 7.

Current waveform 702i includes a rising ramp or edge (i.e., a ramp-up portion or leading current ramp), a relatively flat peak or middle portion (i.e., a current peak) following the rising ramp, and a falling ramp or edge (i.e., a ramp-down portion or trailing current ramp) following the peak. That is, the rising and falling ramps straddle the peak. The peak is relatively flat compared to the rising ramp, meaning that a slope of the peak approaches zero and is thus substantially less than the slopes of the rising and falling ramps. Similarly, voltage waveform 702u includes a rising ramp or edge (i.e., a ramp-up portion or leading voltage ramp), a relatively flat peak or middle portion (i.e., a voltage peak) following the rising ramp, and a falling ramp or edge (i.e., a ramp-down portion or trailing voltage ramp) following the peak. That is, the rising and falling ramps straddle the peak of voltage waveform 702u. The peak of voltage waveform 702u is relatively flat compared to the rising ramp. Voltage waveform 702u includes voltage overshoot and voltage undershoot coinciding with the rising and falling edges, respectively, due inductive voltage drops responsive to fast-changing current levels during the rising and falling current ramps. In practice, a current pulse may have an example current level in a range of 100-700 Amps at the peak of the current pulse. Also, the rising and falling ramps may each have an example time duration in a range of approximately 1-3 milliseconds, while and the peak may have a time duration in a range of 10-30 milliseconds. The time durations apply similarly to the voltage pulse.

FIG. 7 also shows example voltage and current sample points or times (indicated by sample time indexes) at which current and voltage waveforms 702i, 702u may be sampled to provide particular current and voltage values i_filt, u_filt used to perform the calibration, as will be described below. The calibration relies on the following principles.

First, during the calibration, the current and voltage values i_filt, u_filt are collected while the actual arc voltage is forced to zero. Because compensated voltage u_comp represents an estimate of the arc voltage, during calibration, u_comp should also be zero. When u_comp is zero, Eq. (1) simplifies to the following:

$$0 = u\_\text{filt}(t-m) - L \cdot di/dt(t-m) - i\_\text{filt}(t-m) \cdot R.$$

Second, the current ramps (dynamic current) and peak (stable current) of a current pulse have substantially different slopes and may be detected individually based on successive values of current slope di/dt computed based on successive current values i_filt and their respective successive time indexes across the ramps and the peak. Similarly, transitions between the ramps and peak may detected based on di/dt. For example, a relatively high value of di/dt over a relatively short time period (e.g., a millisecond or less), may represent a transition from the rising ramp to the peak, or from the peak to the falling ramp. In contrast, relatively constant di/dt over one or more milliseconds may represent the peak. Also, computed current slopes may be compared against thresholds indicative of a ramp and a peak, e.g., computed current slope>a first threshold may indicate the presence of the current slope, while computed current slope<than a second threshold that is less than the first threshold may indicate the presence of the peak.

Third, during the relatively flat peak of a current pulse (and corresponding voltage pulse), the current slope di/dt is approximately equal to zero, although noise can cause deviations from zero slope. Thus, generally, the inductance voltage drop is reduced to zero, and Eq. (1) further simplifies to the following:

$$0 = u\_\text{filt}(t-m) - i\_\text{filt}(t-m) \cdot R.$$

Accordingly, a value of resistance R may be determined based only on a corresponding pair of current and voltage values i_filt, u_filt taken during the peak of the current pulse and the peak of the corresponding voltage pulse. As shown in FIG. 7, for example, the value of resistance R may be determined using only voltage and current values i_filt, u_filt taken at or in the vicinity of i(t2), u(t2).

Fourth, during the rising ramp or falling ramp of a current pulse (and corresponding voltage pulse), current slope di/dt is non-zero. Thus, once the resistance R has been determined, inductance L may be determined from Eq. (1) based on the known value of R and corresponding current and voltage values u_filt, i_filt taken from the rising ramps or the falling ramps of the current pulse and the corresponding voltage pulse. As shown in FIG. 7, for example, the value of inductance L may be determined using rising ramp voltage and current samples at or in the vicinity of i(t0+m), u(t0+m), or falling ramp voltage and current samples at or in the vicinity of i(t1−m), u(t1−m).

Using the general principles described above, the calibration may employ a number of different methods to determine a value for resistance R during the peak of a current pulse (and the peak of the corresponding voltage pulse). The calibration detects the peak. During the peak, current and voltage pipelines 306i, 306u repeatedly sample and condition the current and voltage to deliver pairs of corresponding current and voltage values i_filt, u_filt. A first method computes a respective value of resistance $R_i$ for each pair or corresponding current and voltage values i_filt($t_i$) u_filt($t_i$), and then computes an average of the resistance values and uses the average as a final/calibrated value for resistance R.

Figure 8:
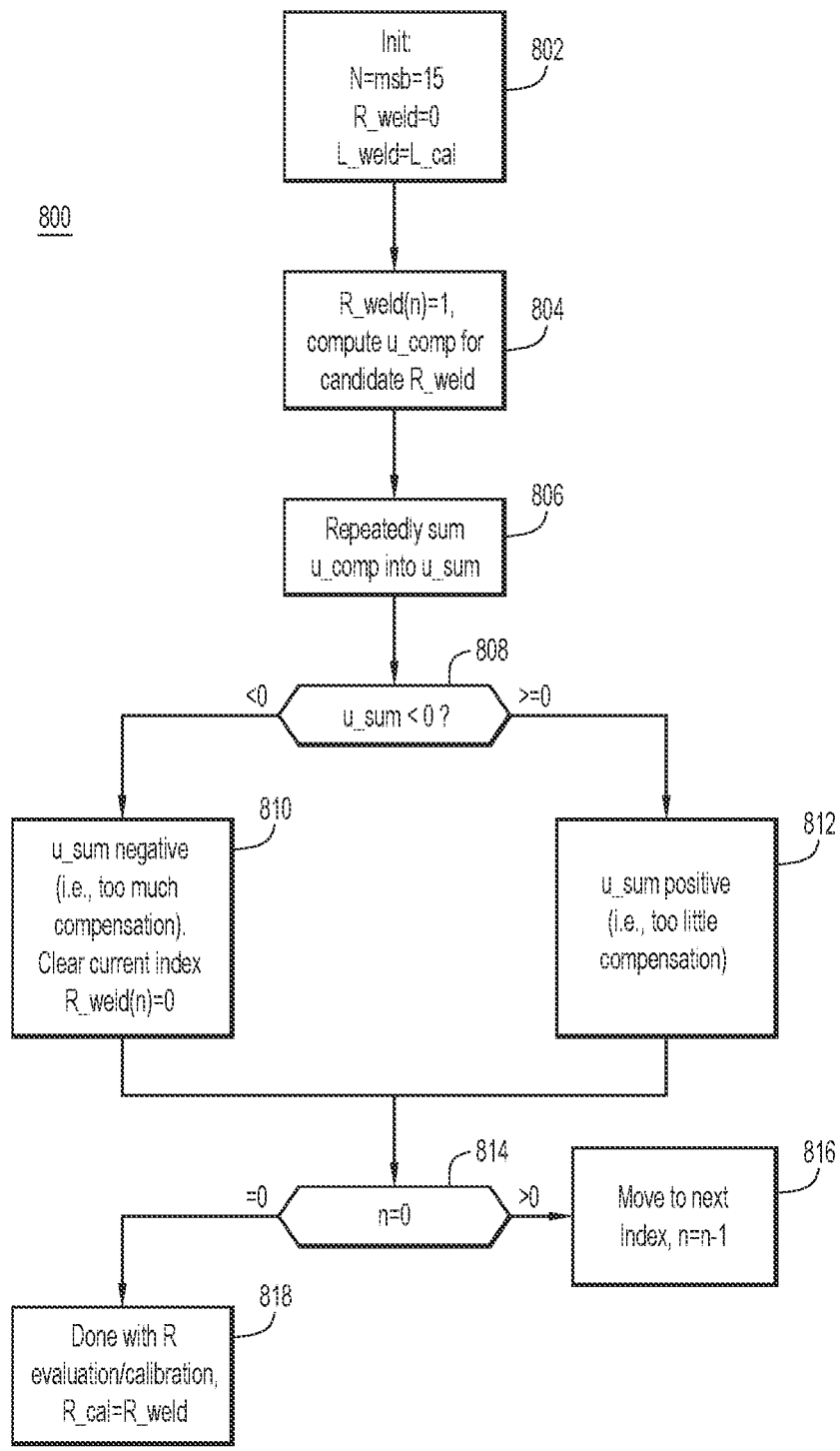
FIG. 8 is a flowchart of an example method of determining a value of resistance of the weld circuit during calibration.

With reference to FIG. 8, there is a flowchart of a second method 800 used to determine the (calibrated) value of resistance R (denoted R_weld). Method 800 may be performed by calibrator 308. Method 800 enhances a signal-to-noise (SNR) in computing the value of resistance R. At a high-level, method 800 searches across a range of candidate resistance values, based on pairs of corresponding current and voltage values i_filt, u_filt collected during the current/voltage pulse peaks, to find a final/calibrated resistance value. More specifically, method 800 tests successive (candidate) values of R_weld that cause compensation voltage u_comp to converge toward zero until an end condition is reached, where a final value of R_weld is the calibrated value. In the example described below, R_weld is represented as a multibit word in a register, where R_weld(n) represents the n'th bit of R_weld.

At 802, method 800 (i) sets n=msb (e.g., n=15 for a 15-bit register), or some other initial/starting value for n, and (ii) sets R_weld=0.

At 804, method 800 sets R_weld(n)=1. For example, when n=15, method 80 sets the 15'th bit (e.g., the msb) of R_weld=1. Using the current value of R_weld (which includes at least the n'th bit set equal to 1, compensated voltage u_comp is computed according to the following equation:

$$u\_comp(t-m)=u\_filt(t-m)-i\_filt(t-m)*R\_weld.$$

Given that the actual arc voltage is zero during the calibration procedure, when R_weld is set correctly, i.e., accurately reflects resistance R, then compensated voltage u_comp should also be zero to reflect the arc voltage. That is, voltage drop i_filt(t−m)*R_weld and u_filt(t−m) should be equal to each other. When R_weld is not correct, compensated voltage u_comp is not zero.

At 806, method 800 applies an error gain to the compensated voltage u_comp to amplify any difference between u_comp and zero (which is the desired target for u_comp). For example, method 800 repeatedly sums u_comp with itself (e.g., 50 times) to produce a summed result u_sum.

At 808, method 800 tests whether u_sum<0. When u_sum<0, indicating there is too much compensation because R_weld is too large, flow proceeds to 810. When u_sum>=0, which indicates there may be too little compensation because R_weld may be too small, flow proceeds to 812.

At 810, method 800 clears only the current bit position in R_weld that was just set equal to 1 at 804, i.e., R_weld(n)=0. This reduces the value of R_weld. All other bit position in R_weld that may have been set equal to 1 previously are maintained at their current values (1 or 0). Flow proceeds to 814.

At 812, method 800 does not clear R_weld(n), i.e., the set value in that bit position is maintained. This keeps the value of R_weld constant. Flow proceeds to 814.

At 814, method 800 tests whether n=0, which indicates that the method is done because there are no more bit positions of R_weld to be tested. When n>0, which indicates that the method is not done, flow proceeds to 816, where n is decremented, and flow returns to 804, to test the next bit position n−1 of R_weld (i.e., to test a next value of R_weld). When n=0, flow proceeds to 818 and the method is done. At 818, R_weld has converged to its final calibrated value (R_cal), and the method declares that the (current) value of R_weld is the final/calibrated value to be used for inductance calibration and arc voltage compensation that follow the calibration of R.

In sum, successive iterations through method 800 test successive (iterative) candidate values of R_weld, and corresponding values of i_filt and u_filt, that cause compensation voltage u_comp to converge ever closer to zero with the successive iterations (or similarly, to cause the computed voltage drop to converge ever closer to voltage value u_filt), until an end condition is reached, where the current value of R_weld is the calibrated value. The end condition may be that all of the bit positions of R_weld have been traversed/tested or that compensated voltage u_comp evaluated with a given test value for R_weld is near zero within a predetermined tolerance, for example. Thus, method 800 represents a successive approximation method for determining the calibrated value of R_weld.

Based on the general principles described above, once the final value for resistance R is determined, the calibration may use a number of different methods to determine a value for inductance L based on subsequent current and voltage values i_filt, u_filt collected during rising or falling ramps of a current pulse (and rising or falling ramps of the corresponding voltage pulse). During the ramps, current and voltage pipelines 306i, 306u repeatedly sample and condition the weld current and voltage to deliver pairs of corresponding current and voltage values i_filt, u_filt. A first method computes a respective value of inductance L for each pair or corresponding current and voltage values i_filt (t) u_filt(t), and the known value for resistance R (e.g., R_weld), then computes an average of the inductance values $L_i$, and uses the average as a final value for inductance L.

Figure 9:
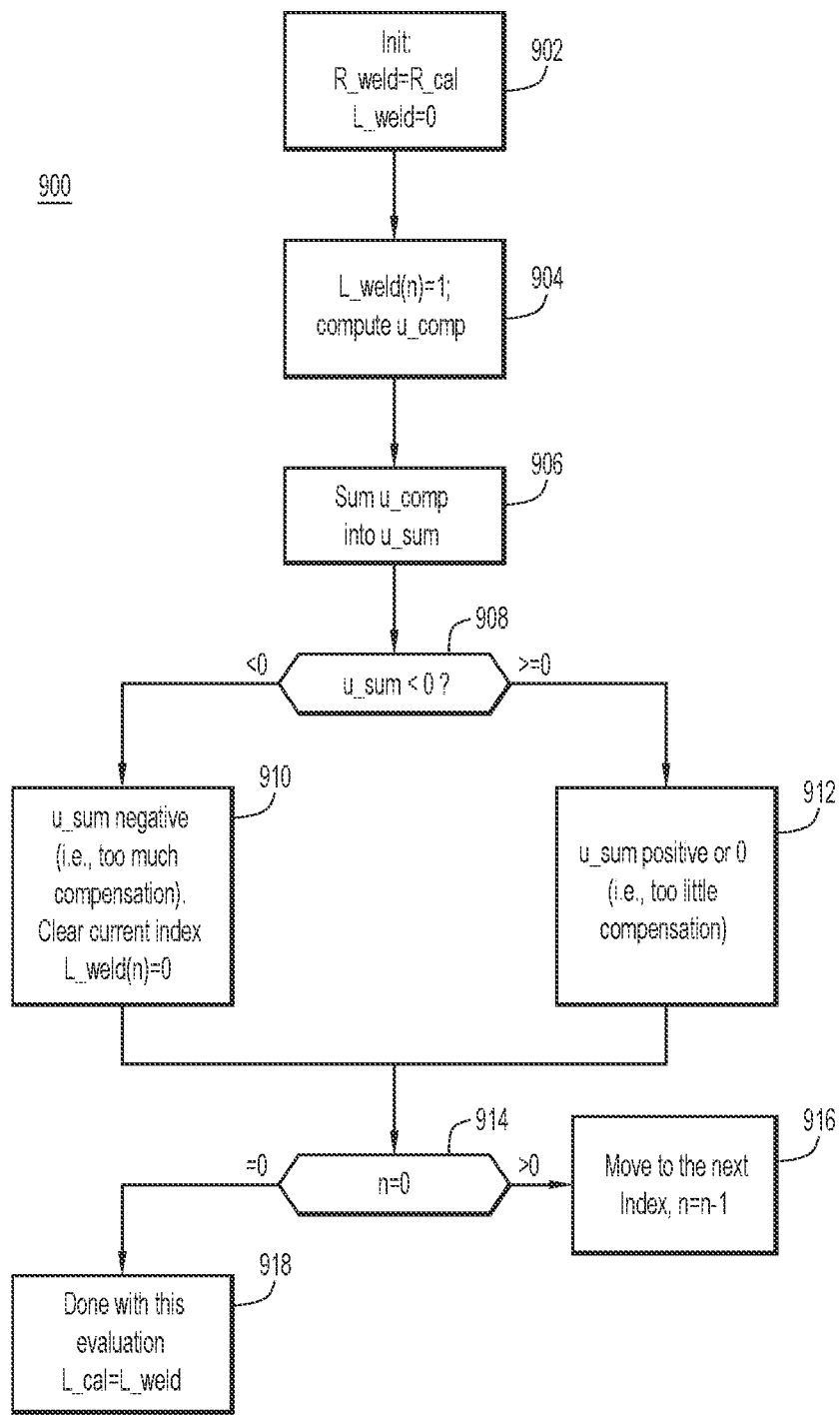
FIG. 9 is a flowchart of an example method of determining a value of inductance of the weld circuit during calibration.

With reference to FIG. 9, there is a flowchart of a second method 900 used to determine the value of inductance L (denoted L_weld) that improves the SNR in the computation of the value of L_weld. Method 800 may be performed by calibrator 308. At a high-level, method 900 searches across a range of candidate inductance values, using pairs of corresponding current and voltage values i_filt, u_filt collected during the current/voltage ramps, to find a final/calibrated inductance value. More specifically, method 900 tests successive values of L_weld that cause compensation voltage u_comp to converge toward zero until an end condition is reached, where a final value of L_weld is the calibrated value. In the example described below, L_weld is represented as a multibit word in a register, where L_weld(n) represents the n'th bit of L_weld.

At 902, method 900 (i) sets n=msb (e.g., n=15 for a 15-bit register), or some other initial/starting value for n, and (ii) sets L_weld=0.

At 904, method 900 sets L_weld(n)=1. For example, when n=15, the 15'th bit (e.g., the msb) of L_weld is set equal to 1. Using the current value of L_weld (which has the n'th bit set equal to 1, possibly along with other bits that were previously set equal to 1), compensated voltage u_comp is computed according to the following equation:

$$u\_comp=u\_filt-i\_filt*L\_weld*di/dt-i\_filt*R\_weld,$$

where R_weld is the calibrated value of R_weld determined by method 800, for example.

Given that the actual arc voltage is zero during the calibration procedure, if L_weld is correct, i.e., accurately reflects the weld circuit inductance L, compensated voltage u_comp should also be zero. Otherwise, u_comp is not zero.

At 906, method 900 applies gain to compensated voltage u_comp to amplify any difference between compensated voltage u_comp and zero (which is the desired target for u_comp). For example, method 900 repeatedly sums u_comp (e.g., 50 times) to produce a summed result L_sum.

At 908, method 900 tests whether u_sum<0. When u_sum<0, indicating there is too much compensation because L_weld is too large, flow proceeds to 910. When u_sum>=0, which indicates there may be too little compensation because L_weld may be too small, flow proceeds to 912.

At 910, method 900 clears only the current bit position in L_weld that was just set equal to 1 at 904, i.e., L_weld(n)=0. All other bit position in L_weld that may have been set equal to 1 previously are maintained at their current values (1 or 0). This reduces the value of L_weld. Flow proceeds to 914.

At 912, method 900 does not clear L_weld(n), i.e., the set value in that bit position is maintained. Flow proceeds to 914.

At 914, method 900 tests whether n=0, which indicates that the method is done because there are no more bit positions of L_weld to be tested. When n>0, which indicates that the method is not done, flow proceeds to 916, where n is decremented, and flow returns to 904, to test the next bit position n−1 of L_weld (i.e., to test a next value of L_weld, with L_weld(n−1)=1). When n=0, flow proceeds to 918 and the method is done. At 918, L_weld is at its final calibrated value (L_cal), and the method declares that the (current) value of L_weld is the final/calibrated value to be used for the arc voltage compensation that follows the calibration.

In sum, successive iterations through method 900 test successive (iterative) candidate values of L_weld, and corresponding values of i_filt and u_filt, that cause compensation voltage u_comp to converge ever closer to zero with the successive iterations, until an end condition is reached, where the current value of L_weld is the calibrated value. The end condition may be that all of the bit positions of L_weld have been tested, that compensated voltage u_comp evaluated with a given test value for L_weld is near zero within a predetermined tolerance, and so on. Thus, method 900 represents a successive approximation method for determining the calibrated value of L_weld.

Methods 800 and 900 may be generalized as follows. Voltage values u_filt differ from arc voltage $V_{ARC}$, which is set equal to zero during calibration, by an amount that is equal to a voltage drop (−IR or −IR−L*dI/dt) that is a function of the electrical circuit parameter (R or R and L) and current values u_filt corresponding to the voltage values u_filt. Computing the electrical circuit parameter includes iteratively testing successive candidate values of the electrical circuit parameter (represented as R_weld or L_weld) to find, as the final (calibrated) electrical circuit parameter, the candidate value that would cause the voltage drop (−IR or −IR−L*dI/dt) in the weld circuit to be equal to voltage value u_filt (and their difference to be equal to zero). For example, using a candidate value of the electrical circuit parameter, the computing includes computing a corresponding candidate voltage drop that would occur based on the candidate value of the electrical circuit parameter and a particular current value i_filt, and testing whether a difference between the computed voltage drop and a particular voltage value u_filt that corresponds to the particular current value is zero (which is the arc voltage $V_{ARC}$). When the difference is not zero, the computing includes selecting a next candidate value of the electrical circuit parameter that would drive the difference closer to zero, and repeating the computing and the testing based on the next candidate value.

Figure 10:
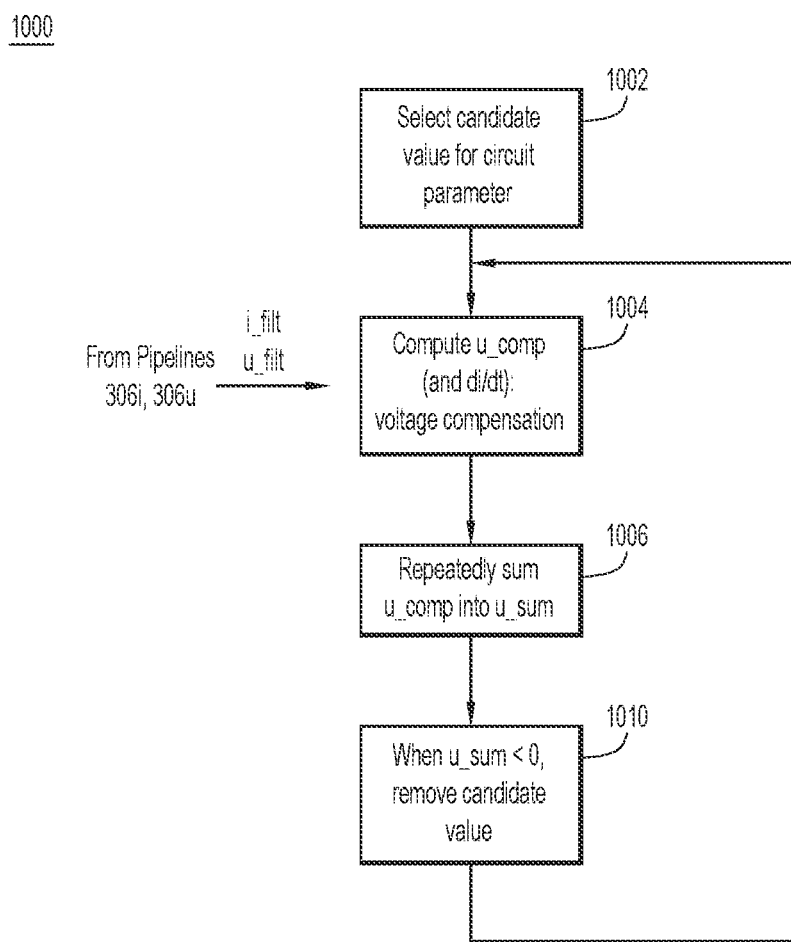
FIG. 10 is an illustration of an example implementation of calibration and arc voltage compensation that integrates operations from the resistance and inductance determining methods of FIGS. 8 and 9 with operations from the arc voltage compensation method of FIG. 6.

With reference to FIG. 10, there is an example generalized method 1000 for calibrating an electrical circuit parameter, e.g., R and L. At 1002, a candidate value for the electrical circuit parameter is selected. At 1004, compensated voltage u_comp is computed using the candidate value and corresponding current and voltage u_filt and i_filt from pipelines 306u, 306i. At 1006, u_comp is repetitively summed into u_sum. This provides an indication of whether the difference between the (computed) voltage drop caused by the candidate value is equal to u_filt (such that the difference u_filt− voltage drop=0 (i.e., the zero arc voltage $V_{ARC}$). At 1010, when u_sum<0 (or more broadly, u_sum≠0), the candidate value is dropped, and a next candidate value is selected that will drive u_sum closer to 0, and the process repeats with the next candidate value. Operations 1004-1110 repeat until an end condition is met, at which time the current candidate value is the final value for the electrical circuit parameter.

Figure 11:
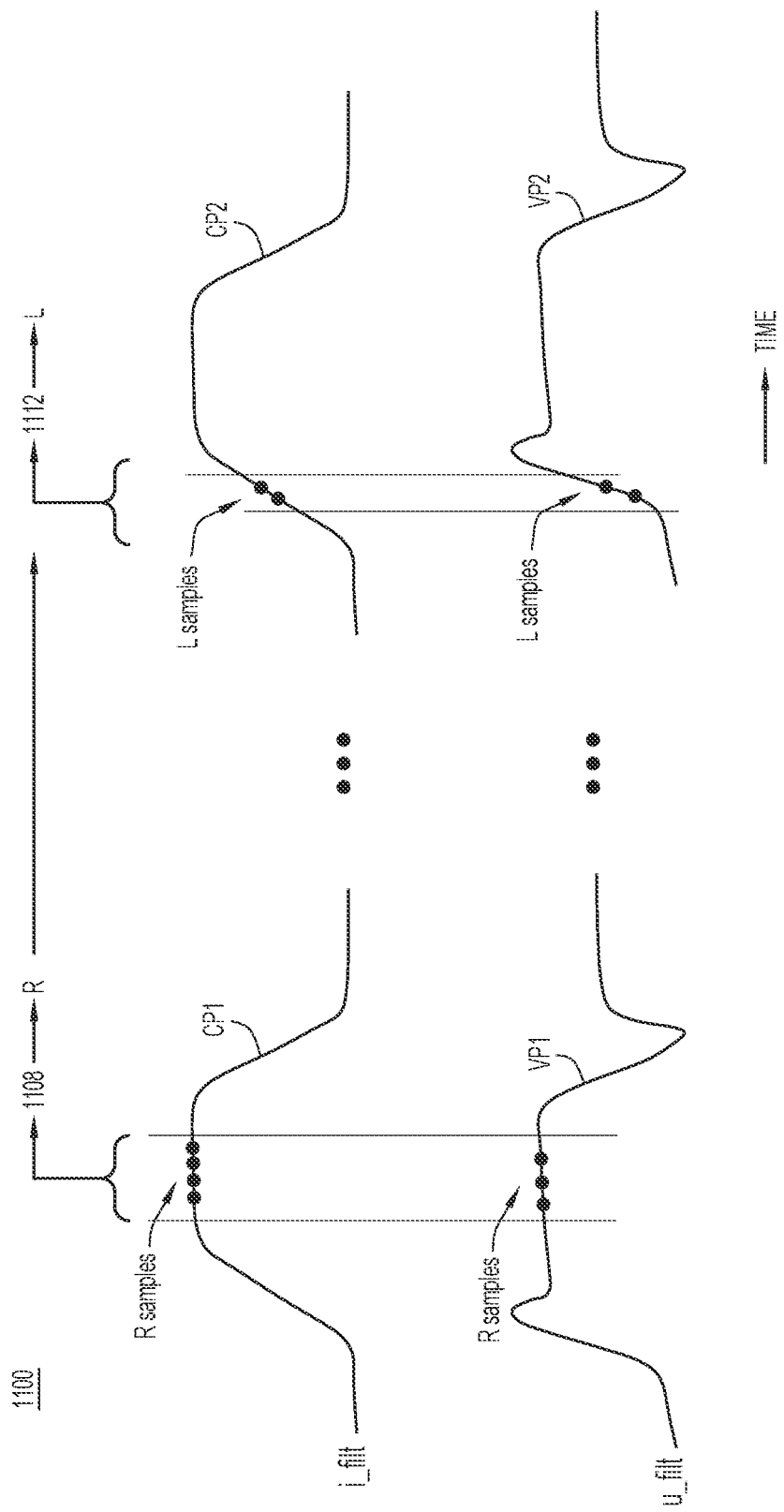
FIG. 11 is an illustration of an example method of sequentially determining values of resistance and inductance during calibration.

With reference to FIG. 11, there is an illustration of an example method 1100 of sequentially determining values of resistance and inductance R, L during the calibration. Method 1100 assumes that PSC 104 controls power supply to generate a series of weld current pulses for the calibration. The current pulses include time-ordered first and second current pulses CP1, CP2. FIG. 11 shows time-ordered first and second voltage pulses VP1 and VP2 corresponding to current pulses CP1, CP2. Current and voltage pipelines 306i, 306u repeatedly sample sensed current and voltage i, u during the series of current pulses and the associated voltage pulses, to produce a series of current and voltage values i_filt, u_filt that trace the current and voltage waveforms generated by power supply 102.

At 1108, the calibration determines a value of resistance R based on first current and voltage values i_filt, u_filt (denoted "R samples") taken during the peaks of first current and voltage pulses CP1, VP1 (i.e., during the current peak and the corresponding voltage peak), using the techniques described above. Operation 1108 may be repeated multiple times for multiple next current pulses to produce multiple corresponding values of resistance R, which are then averaged to yield a final value of resistance R. Also, at 1108, the calibration measures a time period of the rising slope of current pulse CP1, e.g., the time period between 10% and 90% current levels of the rising slope.

At 1112, the calibration determines a value of inductance L based on the value of resistance R (which may be a single value, or the above-mentioned average value) and second current and voltage values i_filt, u_filt (denoted "L samples") taken during the rising (or falling) ramps of second current and voltage pulses CP2, VP2 (i.e., during the current ramp and the corresponding voltage ramp). The calibration may select the samples so that they fall within the time period of the rising slope determined at 1108.

Operations 1108 and 1112 may repeat for subsequent current pulses to refine the values of resistance and inductance R, L, e.g., to improve the SNR during the calibration.

Figure 12:
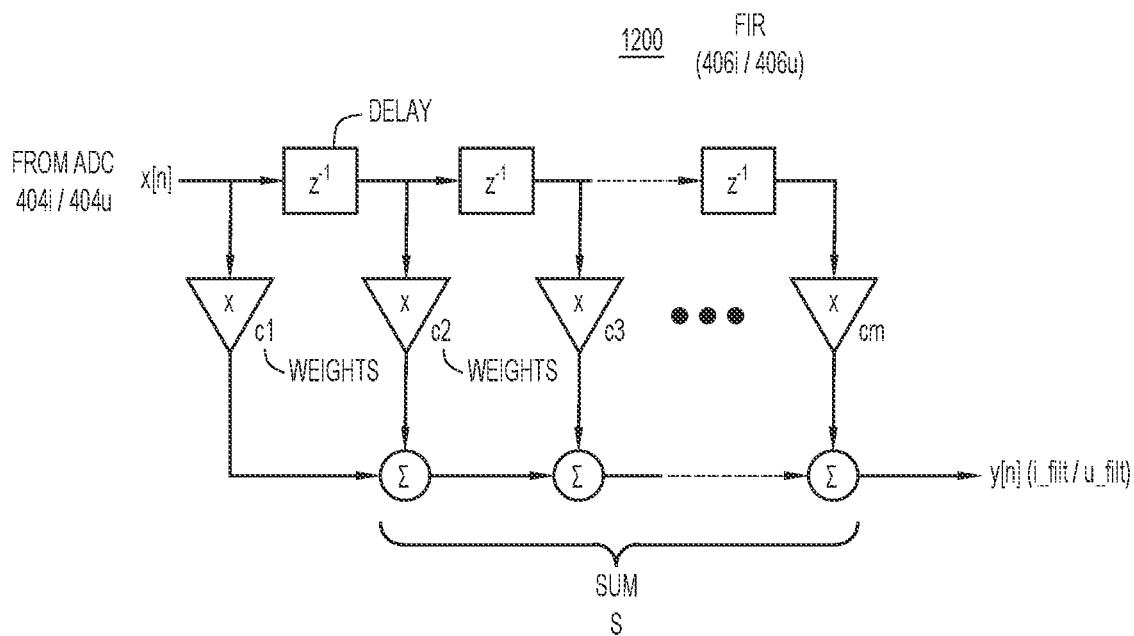
FIG. 12 is a block diagram of an example Finite Impulse response (FIR) filter structure that may be used in digital filters of the PSC.

[(moo] FIG. 12 is a block diagram of an example FIR filter 1200 that may be used in digital filters 406i, 406u. FIR filter 1200 shifts digitized current/voltage values from ADC 404i/404u through sample delay stages (denoted $z^{-1}$) connected in series, and applies respective ones of weights/ coefficients C1-CM to value taps from each of the sample delay stages, and sums the resulting weighted values at summers S, to produce filtered digitized current/voltage values i_filt/u felt.

Figure 13:
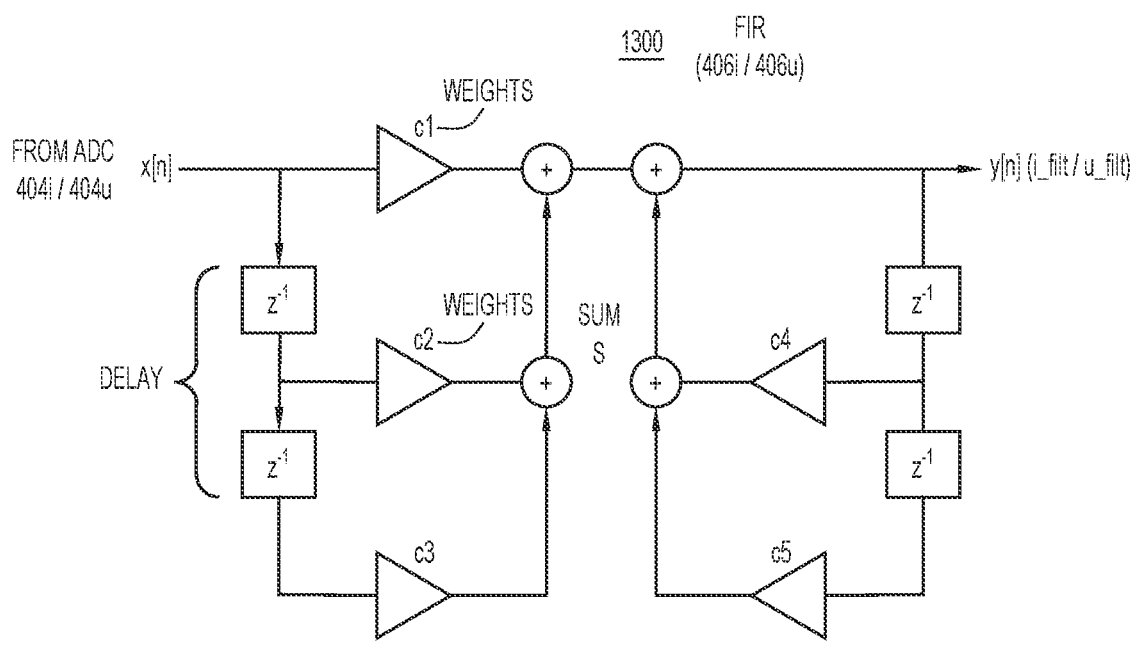
FIG. 13 is a block diagram of an example Infinite Impulse response (IIR) filter structure that may be used in digital filters of the PSC.

FIG. 13 is a block diagram of an example IIR filter 1300 that may be used in digital filters 406i, 406u. IIR filter 1300 shifts digitized current/voltage values from ADC 404i/404u through sample delay stages (denoted $z^{-1}$) connected in a feedback structures as shown in FIG. 13, and applies respective ones of weights/coefficients C1-C5 to value taps from each of the sample delay stages, and sums the resulting weighted values at summers S, to produce filtered digitized current/voltage values i_filt/u_filt.

By way of example, the embodiments presented herein have been described in the context of processing (e.g., sampling, filtering, and so on) current pulses and corresponding voltage pulses produced by a power supply for welding or cutting, to control and compensate the current/ voltage pulses. In other embodiments, such processing may also be performed on current and voltage that is not necessarily pulsed, i.e., non-pulsed or steady state (e.g., DC) current and voltage, to control and compensate the current/voltage that is not pulsed.

In summary, in some aspects, the techniques described herein relate to a method performed in a welding or cutting system, including a power supply configured to deliver current pulses through a weld circuit to a contact tip extending from a welding torch to create an arc on a workpiece, the method comprising: while the contact tip is shorted to the workpiece to set an arc voltage equal to zero: sampling a current pulse to produce current values; and at a voltage sense point, on the power supply or the weld circuit, that is spaced-apart from the welding torch, sampling a voltage pulse associated with the current pulse to produce voltage values that differ from the arc voltage due to an electrical circuit parameter of the weld circuit; and computing a value of the electrical circuit parameter based on the current values, the voltage values, and the arc voltage equal to zero.

In some aspects, the techniques described herein relate to a method, further including: while the contact tip is shorted to the workpiece to set the arc voltage equal to zero: sampling a second current pulse to produce second current values; and at the voltage sense point, sampling a second voltage pulse associated with the second current pulse to produce second voltage values that differ from the arc voltage due to the electrical circuit parameter and a second electrical circuit parameter of the weld circuit; and computing a value of the second electrical circuit parameter based on the electrical circuit parameter, the second current values, the second voltage values, and the arc voltage equal to zero.

In some aspects, the techniques described herein relate to a method, wherein: sampling the current pulse includes digitizing the current values to produce digitized current values; sampling the voltage pulse includes digitizing the voltage values to produce digitized voltage values; and the method further includes: filtering the digitized current values with a first digital filter having a first low pass filter response, to produce filtered digitized current values as the current values; and filtering the digitized voltage values with a second digital filter having a second low pass filter response, to produce filtered digitized voltage values as the voltage values, wherein computing includes computing the value of the electrical circuit parameter based on the filtered digitized current values, the filtered digitized voltage values, and the arc voltage equal to zero.

In some aspects, the techniques described herein relate to a method, wherein the first low pass filter response and the second low pass filter response match each other.

In some aspects, the techniques described herein relate to a method, wherein the electrical circuit parameter is a resistance of the weld circuit, and computing includes computing a value of the resistance as the value.

In some aspects, the techniques described herein relate to a method, wherein the electrical circuit parameter is an inductance of the weld circuit, and computing includes computing a value of the inductance as the value.

In some aspects, the techniques described herein relate to a method, wherein the voltage values differ from the arc voltage that is set equal to zero by a voltage drop that is a function of the electrical circuit parameter and current in the weld circuit, and computing includes iteratively testing successive candidate values of the electrical circuit parameter to find, as the value of the electrical circuit parameter, one of the successive candidate values that would cause the voltage drop in the weld circuit.

In some aspects, the techniques described herein relate to a method, wherein computing further includes: using a candidate value of the electrical circuit parameter, computing a voltage drop that would occur based on the candidate value of the electrical circuit parameter and a particular current value among the current values, and testing whether a difference between the computed voltage drop and a particular voltage value among the voltage values that corresponds to the particular current value is zero; and when the difference is not zero, selecting a next candidate value of the electrical circuit parameter that would drive the difference closer to zero, and repeating computing and testing based on the next candidate value.

In some aspects, the techniques described herein relate to a method, further including, during a weld operation during which the contact tip is not shorted to the workpiece: sampling a weld current pulse configured to create an arc on the workpiece, to produce weld current values; at the voltage sense point, sampling a weld voltage pulse corresponding to the weld current pulse, to produce weld voltage values; and compensating the weld voltage values based on the weld current values and at least the value of the electrical circuit parameter, to produce compensated voltage values that accurately reflect the arc voltage.

In some aspects, the techniques described herein relate to a method, wherein: the current pulse includes a current ramp and a current peak that is relatively flat compared to the current ramp, and the voltage pulse includes a voltage ramp and a voltage peak that is relatively flat compared to the voltage ramp; sampling the current pulse includes sampling the current peak, to produce the current values; and sampling the voltage pulse includes sampling the voltage peak, to produce the voltage values.

In some aspects, the techniques described herein relate to a method, wherein: the current pulse includes a current ramp and a current peak that is relatively flat compared to the current ramp, and the voltage pulse includes a voltage ramp and a voltage peak that is relatively flat compared to the voltage ramp; sampling the current pulse includes sampling the current ramp, to produce the current values; and sampling the voltage pulse includes sampling the voltage ramp, to produce the voltage values.

In some aspects, the techniques described herein relate to an apparatus for welding or cutting including: a power supply configured to deliver current pulses through a weld circuit to a contact tip extending from a welding torch to create an arc on a workpiece; and a controller coupled to the power supply and configured to perform: while the contact tip is shorted to the workpiece to set an arc voltage equal to zero: sampling a current pulse to produce current values; and at a voltage sense point, on the power supply or the weld circuit, that is spaced-apart from the welding torch, sampling a voltage pulse associated with the current pulse to produce voltage values that differ from the arc voltage due to an electrical circuit parameter of the weld circuit; and computing a value of the electrical circuit parameter based on the current values, the voltage values, and the arc voltage equal to zero.

In some aspects, the techniques described herein relate to an apparatus, wherein the controller is further configured to perform: while the contact tip is shorted to the workpiece to set the arc voltage equal to zero: sampling a second current pulse to produce second current values; and at the voltage sense point, sampling a second voltage pulse associated with the second current pulse to produce second voltage values that differ from the arc voltage due to the electrical circuit parameter and a second electrical circuit parameter of the weld circuit; and computing a value of the second electrical circuit parameter based on the electrical circuit parameter, the second current values, the second voltage values, and the arc voltage equal to zero.

In some aspects, the techniques described herein relate to an apparatus, wherein the controller is configured to perform: sampling the current pulse by digitizing and then low pass filtering the current values to produce filtered digitized current values as the current values; sampling the voltage pulse by digitizing and then filtering the voltage values to produce filtered digitized voltage values as the voltage values; and computing by computing the value of the electrical circuit parameter based on the filtered digitized current values, the filtered digitized voltage values, and the arc voltage equal to zero.

In some aspects, the techniques described herein relate to an apparatus, wherein the electrical circuit parameter is a resistance of the weld circuit, and the controller is configured to perform computing by computing a value of the resistance as the value.

In some aspects, the techniques described herein relate to an apparatus, wherein the electrical circuit parameter is an inductance of the weld circuit, and the controller is configured to perform computing by computing a value of the inductance as the value.

In some aspects, the techniques described herein relate to an apparatus, wherein the voltage values differ from the arc voltage that is set equal to zero by a voltage drop that is a function of the electrical circuit parameter and current in the weld circuit, and the controller is configured to perform computing by iteratively testing successive candidate values of the electrical circuit parameter to find, as the value of the electrical circuit parameter, one of the successive candidate values that would cause the voltage drop in the weld circuit.

In some aspects, the techniques described herein relate to an apparatus, wherein the controller is further configured to perform, during a weld operation during which the contact tip is not shorted to the workpiece: sampling a weld current pulse configured to create an arc on the workpiece, to produce weld current values; at the voltage sense point, sampling a weld voltage pulse corresponding to the weld current pulse, to produce weld voltage values; and compensating the weld voltage values based on the weld current values and at least the value of the electrical circuit parameter, to produce compensated voltage values that accurately reflect the arc voltage.

In some aspects, the techniques described herein relate to an apparatus, wherein the current pulse includes a current ramp and a current peak that is relatively flat compared to the current ramp, the voltage pulse includes a voltage ramp and a voltage peak that is relatively flat compared to the voltage ramp, and the controller is configured to perform: sampling the current pulse by sampling the current peak, to produce the current values; and sampling the voltage pulse by sampling the voltage peak, to produce the voltage values.

In some aspects, the techniques described herein relate to an apparatus, wherein the current pulse includes a current ramp and a current peak that is relatively flat compared to the current ramp, the voltage pulse includes a voltage ramp and a voltage peak that is relatively flat compared to the voltage ramp, and the controller is configured to perform: sampling the current pulse by sampling the current ramp, to produce the current values; and sampling the voltage pulse by sampling the voltage ramp, to produce the voltage values.

In some aspects, the techniques described herein relate to a method performed in a welding or cutting system including a power supply configured to deliver a current to a welding torch to create an arc on a workpiece, the method comprising: sampling the current to produce digitized current values; filtering the digitized current values using a first digital filter to produce filtered digitized current values; sampling a voltage corresponding to the current to produce digitized voltage values; filtering the digitized voltage values using a second digital filter to produce filtered digitized voltage values; and controlling a current level of the current using the filtered digitized current values or the filtered digitized voltage values.

In some aspects, the techniques described herein relate to a method, wherein: the first digital filter has a first low pass frequency response; and the second digital filter has a second low pass frequency response.

In some aspects, the techniques described herein relate to a method, wherein: the first digital filter includes a Finite Impulse Response (FIR) filter or an Infinite Impulse Response (IIR) filter; and the second digital filter includes an FIR filter or an IIR filter.

In some aspects, the techniques described herein relate to a method, wherein the first low pass frequency response matches the second low pass frequency response.

In some aspects, the techniques described herein relate to a method, wherein: the first digital filter attenuates power supply switching noise on the current; and the second digital filter attenuates power supply switching noise on the voltage.

In some aspects, the techniques described herein relate to a method, wherein: sampling the current includes sampling the current at a first sample rate; and sampling the voltage includes sampling the voltage concurrently with sampling the current and at a second sample rate that matches the first sample rate.

In some aspects, the techniques described herein relate to a method, further including: filtering the current with a first anti-aliasing filter to produce an anti-aliased current, wherein sampling the current includes sampling the anti-aliased current; and filtering the voltage with a second anti-aliasing filter to produce an anti-aliased voltage, wherein sampling the voltage includes sampling the anti-aliased voltage.

In some aspects, the techniques described herein relate to a method, wherein: the filtered digitized voltage values differ from an arc voltage based on an electrical circuit parameter of a weld circuit through which the power supply delivers the current to the welding torch; and controlling includes: compensating the filtered digitized voltage values based on the filtered digitized current values and a known value of the electrical circuit parameter, to produce compensated voltage values as an estimate of the arc voltage; and controlling the current level of the current based on the compensated voltage values.

In some aspects, the techniques described herein relate to a method, wherein sampling the voltage includes sampling the voltage at a voltage sense point, on the power supply or the weld circuit, that is spaced-apart from the welding torch, such that the electrical circuit parameter introduces a voltage drop that causes the filtered digitized voltage values to differ from the arc voltage.

In some aspects, the techniques described herein relate to a method, wherein the electrical circuit parameter includes a resistance of the weld circuit, and compensating includes compensating the filtered digitized voltage values based on the filtered digitized current values and a known value of the resistance, to produce the compensated voltage values.

In some aspects, the techniques described herein relate to a method, wherein the electrical circuit parameter includes an inductance of the weld circuit, and compensating includes compensating the filtered digitized voltage values based on the filtered digitized current values and a known value of the inductance, to produce the compensated voltage values.

In some aspects, the techniques described herein relate to a method, further including: calibrating the weld circuit using a calibration current, to determine a value of the electrical circuit parameter.

In some aspects, the techniques described herein relate to an apparatus for welding or cutting including: a power supply configured to deliver a current to a welding torch to create an arc on a workpiece; and a controller coupled to the power supply including: a first digitizer to sample the current to produce digitized current values; a first digital filter to filter the digitized current values, to produce filtered digitized current values; a second digitizer to sample a voltage corresponding to the current to produce digitized voltage values; and a second digital filter to filter the digitized voltage values to produce filtered digitized voltage values, wherein the controller is configured to control a current level of the current using the filtered digitized current values or the filtered digitized voltage values.

In some aspects, the techniques described herein relate to an apparatus, wherein: the first digital filter has a first low pass frequency response; and the second digital filter has a second low pass frequency response.

In some aspects, the techniques described herein relate to an apparatus, wherein: the first digital filter includes a Finite Impulse Response (FIR) filter or an Infinite Impulse Response (IIR) filter; and the second digital filter includes an FIR filter or an IIR filter.

In some aspects, the techniques described herein relate to an apparatus, wherein the first low pass frequency response matches the second low pass frequency response.

In some aspects, the techniques described herein relate to an apparatus, wherein: the first digital filter has a frequency response configured to attenuate power supply switching noise on the current; and the second digital filter has a frequency response configured to attenuate power supply switching noise on the voltage.

In some aspects, the techniques described herein relate to an apparatus, wherein: the first digitizer is configured to sample the current at a first sample rate; and the second digitizer is configured to sample the voltage concurrently with sampling of the current and at a second sample rate that matches the first sample rate.

In some aspects, the techniques described herein relate to an apparatus, wherein the controller further includes: a first anti-aliasing filter to filter the current to produce an anti-aliased current to be sampled by the first digitizer; and a second anti-aliasing filter to filter the voltage to produce an anti-aliased voltage to be sampled by the second digitizer.

In some aspects, the techniques described herein relate to an apparatus, wherein the filtered digitized voltage values differ from an arc voltage based on an electrical circuit parameter of a weld circuit through which the power supply is configured to supply the current to the welding torch, and the controller is further configured to perform: compensating the filtered digitized voltage values based on the filtered digitized current values and a known value of the electrical circuit parameter, to produce compensated voltage values as an estimate of the arc voltage; and controlling the current level of the current based on the compensated voltage values.

In some aspects, the techniques described herein relate to a non-transitory computer readable medium encoded with instructions that, when executed by a processor/controller in a welding or cutting system, including a power supply configured to deliver current pulses through a weld circuit to a contact tip extending from a welding torch to create an arc on a workpiece, cause the processor/controller to perform: while the contact tip is shorted to the workpiece to set an arc voltage equal to zero: sampling a current pulse to produce current values (or receiving the current values); and at a voltage sense point, on the power supply or the weld circuit, that is spaced-apart from the welding torch, sampling a voltage pulse associated with the current pulse to produce voltage values (or receiving the voltage values) that differ from the arc voltage due to an electrical circuit parameter of the weld circuit; and computing a value of the electrical circuit parameter based on the current values, the voltage values, and the arc voltage equal to zero.

In some aspects, the techniques described herein relate to a non-transitory computer readable medium encoded with instructions that, when executed by a processor/controller in a welding or cutting system including a power supply configured to deliver a current to a welding torch to create an arc on a workpiece, cause the processor/controller to perform: sampling the current to produce digitized current values (or receiving the digitized current values); filtering the digitized current values using a first digital filter to produce filtered digitized current values; sampling a voltage corresponding to the current to produce digitized voltage values (or receiving the digitized voltage values); filtering the digitized voltage values using a second digital filter to produce filtered digitized voltage values; and controlling a current level of the current using the filtered digitized current values or the filtered digitized voltage values.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed in a welding or cutting system, including a power supply configured to deliver current pulses through a weld circuit to a contact tip extending from a welding torch to create an arc on a workpiece, comprises:
    while the contact tip is shorted to the workpiece to set an arc voltage equal to zero:
        sampling, on a current pulse having a current ramp and a current peak that is relatively flat compared to the current ramp, the current peak to produce current values; and
        at a voltage sense point, on the power supply or the weld circuit, that is spaced-apart from the welding torch, sampling, on a voltage pulse associated with the current pulse and that has a voltage ramp and a voltage peak that is relatively flat compare to the voltage ramp, the voltage peak to produce voltage values that differ from the arc voltage due to an electrical circuit parameter of the weld circuit; and
    computing a value of the electrical circuit parameter based on the current values, the voltage values, and the arc voltage equal to zero.

2. The method of claim 1, further comprising:
while the contact tip is shorted to the workpiece to set the arc voltage equal to zero:
sampling a second current pulse to produce second current values; and
at the voltage sense point, sampling a second voltage pulse associated with the second current pulse to produce second voltage values that differ from the arc voltage due to the electrical circuit parameter and a second electrical circuit parameter of the weld circuit; and
computing a value of the second electrical circuit parameter based on the electrical circuit parameter, the second current values, the second voltage values, and the arc voltage equal to zero.

3. The method of claim 1, wherein:
sampling the current pulse includes digitizing the current values to produce digitized current values;
sampling the voltage pulse includes digitizing the voltage values to produce digitized voltage values; and
the method further comprises:
filtering the digitized current values with a first digital filter having a first low pass filter response, to produce filtered digitized current values as the current values; and
filtering the digitized voltage values with a second digital filter having a second low pass filter response, to produce filtered digitized voltage values as the voltage values,
wherein computing includes computing the value of the electrical circuit parameter based on the filtered digitized current values, the filtered digitized voltage values, and the arc voltage equal to zero.

4. The method of claim 3, wherein the first low pass filter response and the second low pass filter response match each other.

5. The method of claim 1, wherein the electrical circuit parameter is a resistance of the weld circuit, and computing includes computing a value of the resistance as the value.

6. The method of claim 1, wherein the electrical circuit parameter is an inductance of the weld circuit, and computing includes computing a value of the inductance as the value.

7. The method of claim 1, wherein the voltage values differ from the arc voltage that is set equal to zero by a voltage drop that is a function of the electrical circuit parameter and current in the weld circuit, and computing includes iteratively testing successive candidate values of the electrical circuit parameter to find, as the value of the electrical circuit parameter, one of the successive candidate values that would cause the voltage drop in the weld circuit.

8. The method of claim 7, wherein computing further includes:
using a candidate value of the electrical circuit parameter, computing a voltage drop that would occur based on the candidate value of the electrical circuit parameter and a particular current value among the current values, and testing whether a difference between the computed voltage drop and a particular voltage value among the voltage values that corresponds to the particular current value is zero; and
when the difference is not zero, selecting a next candidate value of the electrical circuit parameter that would drive the difference closer to zero, and repeating computing and testing based on the next candidate value.

9. The method of claim 1, further comprising, during a weld operation during which the contact tip is not shorted to the workpiece:
sampling a weld current pulse configured to create an arc on the workpiece, to produce weld current values;
at the voltage sense point, sampling a weld voltage pulse corresponding to the weld current pulse, to produce weld voltage values; and
compensating the weld voltage values based on the weld current values and at least the value of the electrical circuit parameter, to produce compensated voltage values that accurately reflect the arc voltage.

10. An apparatus for welding or cutting comprising:
a power supply configured to deliver current pulses through a weld circuit to a contact tip extending from a welding torch to create an arc on a workpiece; and
a controller coupled to the power supply and configured to perform:
while the contact tip is shorted to the workpiece to set an arc voltage equal to zero:
sampling, on a current pulse having a current ramp and a current peak that is relatively flat compared to the current ramp, the current peak to produce current values; and
at a voltage sense point, on the power supply or the weld circuit, that is spaced-apart from the welding torch, sampling, on a voltage pulse associated with the current pulse and that has a voltage ramp and a voltage peak that is relatively flat compare to the voltage ramp, the voltage peak to produce voltage values that differ from the arc voltage due to an electrical circuit parameter of the weld circuit; and
computing a value of the electrical circuit parameter based on the current values, the voltage values, and the arc voltage equal to zero.

11. The apparatus of claim 10, wherein the controller is further configured to perform:
while the contact tip is shorted to the workpiece to set the arc voltage equal to zero:
sampling a second current pulse to produce second current values; and
at the voltage sense point, sampling a second voltage pulse associated with the second current pulse to produce second voltage values that differ from the arc voltage due to the electrical circuit parameter and a second electrical circuit parameter of the weld circuit; and
computing a value of the second electrical circuit parameter based on the electrical circuit parameter, the second current values, the second voltage values, and the arc voltage equal to zero.

12. The apparatus of claim 10, wherein the controller is configured to perform:
sampling the current pulse by digitizing and then low pass filtering the current values to produce filtered digitized current values as the current values;
sampling the voltage pulse by digitizing and then filtering the voltage values to produce filtered digitized voltage values as the voltage values; and
computing by computing the value of the electrical circuit parameter based on the filtered digitized current values, the filtered digitized voltage values, and the arc voltage equal to zero.

13. The apparatus of claim 10, wherein the electrical circuit parameter is a resistance of the weld circuit, and the controller is configured to perform computing by computing a value of the resistance as the value.

14. The apparatus of claim 10, wherein the electrical circuit parameter is an inductance of the weld circuit, and the controller is configured to perform computing by computing a value of the inductance as the value.

15. The apparatus of claim 10, wherein the voltage values differ from the arc voltage that is set equal to zero by a voltage drop that is a function of the electrical circuit parameter and current in the weld circuit, and the controller is configured to perform computing by iteratively testing successive candidate values of the electrical circuit parameter to find, as the value of the electrical circuit parameter, one of the successive candidate values that would cause the voltage drop in the weld circuit.

16. The apparatus of claim 10, wherein the controller is further configured to perform, during a weld operation during which the contact tip is not shorted to the workpiece:
sampling a weld current pulse configured to create an arc on the workpiece, to produce weld current values;
at the voltage sense point, sampling a weld voltage pulse corresponding to the weld current pulse, to produce weld voltage values; and
compensating the weld voltage values based on the weld current values and at least the value of the electrical circuit parameter, to produce compensated voltage values that accurately reflect the arc voltage.

17. A method performed in a welding or cutting system, including a power supply configured to deliver current pulses through a weld circuit to a contact tip extending from a welding torch to create an arc on a workpiece, comprises:
while the contact tip is shorted to the workpiece to set an arc voltage equal to zero:
sampling, on a current pulse that includes a current ramp and a current peak that is relatively flat compared to the current ramp, the current ramp to produce current values; and
at a voltage sense point, on the power supply or the weld circuit, that is spaced-apart from the welding torch, sampling, on a voltage pulse associated with the current pulse and that includes a voltage ramp and a voltage peak that is relatively flat compared to the voltage ramp, the voltage ramp to produce voltage values that differ from the arc voltage due to an electrical circuit parameter of the weld circuit; and
computing a value of the electrical circuit parameter based on the current values, the voltage values, and the arc voltage equal to zero.

* * * * *